(12) United States Patent
Choi et al.

(10) Patent No.: US 12,489,111 B2
(45) Date of Patent: *Dec. 2, 2025

(54) COMPOSITE CATHODE ACTIVE MATERIAL FOR ALL-SOLID-STATE BATTERY, PREPARATION METHOD THEREOF, CATHODE LAYER FOR ALL-SOLID-STATE BATTERY, AND ALL-SOLID-STATE BATTERY INCLUDING THE CATHODE LAYER

(71) Applicant: SAMSUNG SDI CO., LTD., Yongin-si (KR)

(72) Inventors: Byungjin Choi, Yongin-si (KR); Suk-Gi Hong, Yongin-si (KR); Youngsoo Kim, Yongin-si (KR); Donghee Yeon, Yongin-si (KR); Pilsang Yun, Yongin-si (KR); Sangil Han, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 642 days.

This patent is subject to a terminal disclaimer.

(21) Appl. No.: 17/708,267

(22) Filed: Mar. 30, 2022

(65) Prior Publication Data

US 2022/0328823 A1 Oct. 13, 2022

(30) Foreign Application Priority Data

Apr. 2, 2021 (KR) ........................ 10-2021-0043504

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0471* (2013.01); *H01M 4/134* (2013.01);
(Continued)

(58) Field of Classification Search
None
See application file for complete search history.

(56) References Cited

U.S. PATENT DOCUMENTS

2016/0301063 A1 10/2016 Yukinobu et al.
2017/0187035 A1 6/2017 Yanagihara et al.
(Continued)

FOREIGN PATENT DOCUMENTS

KR 10-2016-0064942 A 6/2016
KR 2016-0129731 A 11/2016
(Continued)

OTHER PUBLICATIONS

European Search Report dated Jul. 29, 2002
(Continued)

*Primary Examiner* — Kevin M Bernatz
(74) *Attorney, Agent, or Firm* — Lee IP Law, P.C.

(57) ABSTRACT

A composite cathode active material for an all-solid-state battery including a sulfide solid electrolyte, a preparation method thereof, a cathode layer for an all-solid-state battery, and an all-solid-state battery including the cathode layer, the composite cathode active material including a secondary particle including a plurality of primary particles; and a buffer layer on a surface of the secondary particle, wherein the secondary particle includes a nickel lithium transition metal oxide represented by Formula 1 ($Li_aNi_{1-b}M_bO_2$), the buffer layer includes a first buffer layer adjacent to a surface of the secondary particle and including an oxide represented by Formula 2 ($Li_xA_yO_z$); and a second buffer layer including an oxide represented by Formula 3 ($Li_xE_yO_z$).

18 Claims, 8 Drawing Sheets

(51) Int. Cl.
  *H01M 4/134* (2010.01)
  *H01M 4/1391* (2010.01)
  *H01M 4/36* (2006.01)
  *H01M 4/38* (2006.01)
  *H01M 4/40* (2006.01)
  *H01M 4/62* (2006.01)
  *H01M 10/0562* (2010.01)

(52) U.S. Cl.
  CPC ......... *H01M 4/1391* (2013.01); *H01M 4/366* (2013.01); *H01M 4/382* (2013.01); *H01M 4/405* (2013.01); *H01M 4/62* (2013.01); *H01M 10/0562* (2013.01); *H01M 2300/008* (2013.01)

(56) References Cited

U.S. PATENT DOCUMENTS

| | | | |
|---|---|---|---|
| 2018/0090782 A1 | 3/2018 | Choi et al. | |
| 2018/0212233 A1 | 7/2018 | Ito et al. | |
| 2018/0219219 A1 | 8/2018 | Ito et al. | |
| 2018/0323435 A1* | 11/2018 | Lim | H01M 4/485 |
| 2019/0372109 A1* | 12/2019 | Moon | H01M 4/1391 |
| 2020/0136178 A1 | 4/2020 | Ku et al. | |
| 2020/0358098 A1* | 11/2020 | Kim | C08F 120/18 |
| 2022/0293921 A1* | 9/2022 | Lim | H01M 4/625 |
| 2022/0328809 A1* | 10/2022 | Choi | H01M 4/366 |
| 2023/0187618 A1* | 6/2023 | Park | H01M 4/463 429/223 |
| 2023/0223588 A1* | 7/2023 | Lee | H01M 4/622 429/306 |
| 2023/0335748 A1* | 10/2023 | Chen | H01M 4/134 |
| 2024/0097117 A1 | 3/2024 | Hong et al. | |
| 2024/0154103 A1* | 5/2024 | Lee | H01M 10/0585 |
| 2024/0170666 A1* | 5/2024 | Jo | H01M 4/583 |
| 2024/0222616 A1* | 7/2024 | Jo | H01M 4/505 |
| 2024/0282927 A1* | 8/2024 | Lee | H01M 4/366 |
| 2025/0140848 A1* | 5/2025 | Choi | H01M 4/366 |
| 2025/0183293 A1* | 6/2025 | Doo | H01M 4/525 |
| 2025/0192158 A1* | 6/2025 | Kang | H01M 4/1391 |

FOREIGN PATENT DOCUMENTS

| | | |
|---|---|---|
| KR | 10-2018-0076275 A | 7/2018 |
| KR | 10-2018-0087102 A | 8/2018 |
| KR | 10-2018-0123369 A | 11/2018 |
| KR | 2020-0046485 A | 5/2020 |
| KR | 2020-0050005 A | 5/2020 |

OTHER PUBLICATIONS

Tian, L., Yuan, H., Shao, Q. et al. Synergistic effect of Li2MgTi3O8 coating layer with dual ionic surface doping to improve electrochemical performance of LiNi0.6Co0.2Mn0.2O2 cathode materials. Ionics 26, 4937-4948 (2020). (Year: 2020).

U.S. Office action received in co-pending related U.S. Appl. No. 17/708,303 dated May 19, 2025.

Korean Office action dated Aug. 22, 2025, KR Application No. 10-2021-0043504.

Korean Office action dated Aug. 22, 2025, KR Application No. 10-2021-0043503.

* cited by examiner

COMPOSITE CATHODE ACTIVE MATERIAL FOR ALL-SOLID-STATE BATTERY, PREPARATION METHOD THEREOF, CATHODE LAYER FOR ALL-SOLID-STATE BATTERY, AND ALL-SOLID-STATE BATTERY INCLUDING THE CATHODE LAYER

CROSS-REFERENCE TO RELATED APPLICATION

This application is based on and claims priority under 35 U.S.C. § 119 to Korean Patent Application No. 10-2021-0043504, filed on Apr. 2, 2021, in the Korean Intellectual Property Office, the disclosure of which is incorporated by reference herein in its entirety.

BACKGROUND

1. Field

Embodiments relate to composite cathode active materials for all-solid-state batteries, preparation methods thereof, cathode layers for all-solid-state batteries, and all-solid-state batteries including the cathode layers.

2. Description of the Related Art

Recently, the development of batteries with high energy density and safety has been actively carried out in response to industrial demands. For example, lithium-ion batteries may be put to practical use not only in the fields of information-related devices and communication devices, but also in the fields of automobiles. In the fields of automobiles, safety is especially considered important as being related to life.

SUMMARY

The embodiments may be realized by providing a composite cathode active material for an all-solid-state battery that includes a sulfide solid electrolyte, the composite cathode active material including a secondary particle including a plurality of primary particles; and a buffer layer on a surface of the secondary particle, wherein the secondary particle includes a nickel lithium transition metal oxide represented by Formula 1, the buffer layer includes a first buffer layer adjacent to a surface of the secondary particle and including an oxide represented by Formula 2; and a second buffer layer including an oxide represented by Formula 3, $$Li_aNi_{1-b}M_bO_2 \quad \text{Formula 1}$$

in Formula 1, a and b satisfy the following relations: $0.95 \leq a \leq 1.10$, $0 < b < 0.5$, and M is cobalt (Co), manganese (Mn), aluminum (Al), or a combination thereof, $$Li_xA_yO_z \quad \text{Formula 2}$$

in Formula 2, x, y, and z satisfy the following relations: $0 \leq x \leq 3$, $0 < y \leq 2$, $0 < z \leq 4$, and A is titanium (Ti), silicon (Si), zirconium (Zr), niobium (Nb), boron (B), lanthanum (La), molybdenum (Mo), phosphorus (P), magnesium (Mg), Al, zinc (Zn), or a combination thereof, and $$Li_xE_yO_z \quad \text{Formula 3}$$

in Formula 3, x, y, and z satisfy the following relations: $0 \leq x \leq 3$, $0 < y \leq 2$, $0 < z \leq 4$, and E is different from A of Formula 2, and is Ti, Si, Zr, Nb, B, La, Mo, P, Mg, Al, Zn, or a combination thereof.

The oxide represented by Formula 2 may be represented by Formula 2-1:

$$Li_xTi_yO_z \quad \text{Formula 2-1}$$

in Formula 2-1, x, y, and z satisfy the following relations: $0 \leq x \leq 3$, $0 < y \leq 2$, and $0 < z \leq 4$.

The oxide represented by Formula 3 may be represented by Formula 3-1:

$$Li_xZr_yO_z \quad \text{Formula 3-1}$$

in Formula 3-1, x, y, and z satisfy the following relations: $0 \leq x \leq 3$, $0 < y \leq 2$, and $0 < z \leq 4$.

The oxide represented by Formula 2 may be $Li_2TiO_3$, $Li_2ZrO_3$, $ZrO_2$, $La_2O_3$, $Nb_2O_3$, $B_2O_3$, $TiO_2$, $SiO_2$, $MgO$, $Al_2O_3$, $ZnO$, $Li_3PO_4$, or a combination thereof.

The oxide represented by Formula 3 may be $Li_2ZrO_3$, $Li_2TiO_3$, $ZrO_2$, $La_2O_3$, $Nb_2O_3$, $B_2O_3$, $TiO_2$, $SiO_2$, $MgO$, $Al_2O_3$, $ZnO$, $Li_3PO_4$, or a combination thereof.

The nickel lithium transition metal oxide represented by Formula 1 may have a layered crystal structure, and the oxide represented by Formula 2 and the oxide represented by Formula 3 may each independently have a triclinic crystal structure or a monoclinic crystal structure.

An amount of the oxide represented by Formula 2 may be in a range of about 0.01 mol % to about 0.5 mol %, an amount of the oxide represented by Formula 3 may be in a range of about 0.01 mol % to about 0.5 mol %, and a total amount of the oxide represented by Formula 2 and the oxide represented by Formula 3 may be in a range of about 0.2 mol % to about 0.5 mol %, all mol % being based on 100 mol % of the composite cathode active material.

According to inductively coupled plasma (ICP) analysis for the composite cathode active material, the composite cathode active material may include Ti in an amount of about 0.01 mol % to about 0.5 mol %, and Zr in an amount of about 0.01 mol % to about 0.5 mol %, all mol % being based on 100 mol % of the composite cathode active material.

The nickel lithium transition metal represented by Formula 1 may be represented by Formula 1-1, a compound represented by Formula 1-2, or a combination thereof:

$$Li_aNi_{1-b1-b2}Co_{b1}Mn_{b2}O_2 \quad \text{Formula 1-1}$$

in Formula 1-1, a, b1, and b2 satisfy the following relations: $0.95 \leq a \leq 1.10$, $0 < b1+b2 < 0.5$, $0 < b1 < 0.2$, and $0 < b2 < 0.2$, and $$Li_aNi_{1-b1-b2}Co_{b1}Al_{b2}O_2 \quad \text{Formula 1-2}$$

in Formula 1-2, a, b1, and b2 satisfy the following relations: $0.95 \leq a \leq 1.10$, $0 < b1+b2 < 0.5$, $0 < b1 < 0.2$, and $0 < b2 < 0.05$.

A total thickness of the buffer layer may be in a range of about 5 mm to about 50 nm, a thickness of the first buffer layer may be in a range of about 1 nm to about 20 nm, a thickness of the second buffer layer may be in a range of about 1 nm to about 20 nm, and a thickness ratio of the first buffer layer to the second buffer layer may be in a range of about 0.1 to about 10.

The first buffer layer and the second buffer layer may be conformal coating layers.

The embodiments may be realized by providing a cathode layer for an all-solid-state battery, the cathode layer including the composite cathode active material according to an embodiment.

The embodiments may be realized by providing an all-solid-state battery including a cathode layer; an anode layer; and a solid electrolyte layer therebetween, wherein the cathode layer includes the composite cathode active material according to an embodiment.

The sulfide solid electrolyte may be $Li_2S$—$P_2S_5$, $Li_2S$—$P_2S_5$—LiX, in which X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, in which m and n are positive numbers, and Z is germanium (Ge), Zn, or gallium (Ga), $Li_2S$—$GeS_2$, $Li_2S$—$SiS_2$—$Li_3PO_4$, $Li_2S$—$SiS_2$-$Li_pMO_q$, in which p and q are positive numbers, and M is P, Si, Ge, B, Al, Ga, or indium (In), $Li_{7-x}PS_{6-x}Cl_x$, in which $0≤x≤2$, $Li_{7-x}PS_{6-x}Br_x$, in which $0≤x≤2$, and $Li_{7-x}PS_{6-x}I_x$, in which $0≤x≤2$.

The sulfide solid electrolyte may be an argyrodite-type solid electrolyte including $Li_6PS_5Cl$, $Li_6PS_5Br$, or $Li_6PS_5I$.

The anode layer may include an anode current collector and a first anode active material layer, a second anode active material layer may be on the first anode active material layer, between the anode current collector and the first anode active material layer, or a combination thereof, and the second anode active material layer may include lithium or a lithium alloy.

The anode layer may include an anode current collector and a first anode active material layer, and the all-solid-state battery may further include a carbon layer between the first anode active material layer and the solid electrolyte layer.

The embodiments may be realized by providing a method of preparing a composite cathode active material for an all-solid-state battery according to an embodiment, the method including mixing a nickel lithium transition metal oxide represented by Formula 1, a precursor of an oxide represented by Formula 2, a lithium precursor, an organic solvent, and water to obtain a first mixture; adding, to the first mixture, a precursor of an oxide represented by Formula 3 and an organic solvent to obtain a second mixture and perform a reaction thereon; and drying and heat-treating the reaction product to obtain the composite cathode active material:

         Formula 1 wherein, in Formula 1, a and b satisfy the following relations: $0.95≤a≤1.10$, $0<b<0.5$, and M is cobalt (Co), manganese (Mn), aluminum (Al), or a combination thereof,

         Formula 2 wherein, in Formula 2, x, y, and z satisfy the following relations: $0≤x≤3$, $0<y≤2$, $0<z≤4$, and A is titanium (Ti), silicon (Si), zirconium (Zr), niobium (Nb), boron (B), lanthanum (La), molybdenum (Mo), phosphorus (P), or a combination thereof, and

         Formula 3 wherein, in Formula 3, x, y, and z satisfy the following relations: $0≤x≤3$, $0<y≤2$, $0<z≤4$, and E is different from A in Formula 2, and is Ti, Si, Zr, Nb, B, La, Mo, P, or a combination thereof.

The heat-treating may be performed at a temperature in a range of about 250° C. to about 500° C.

The heat-treating may be performed for about 1 hour to about 20 hours under an oxidizing atmosphere.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
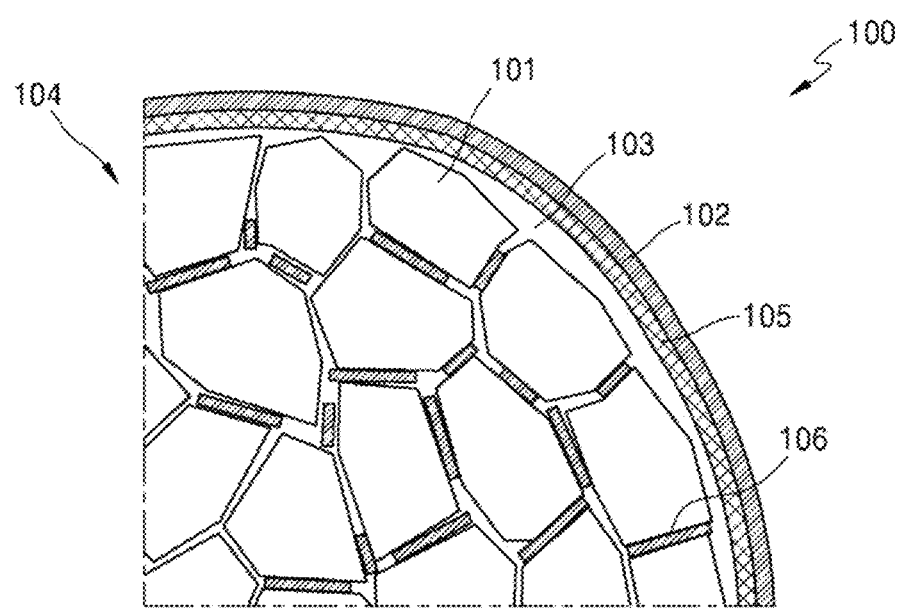
FIG. 1 is a schematic diagram of a partial structure of a composite cathode active material according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Expressions such as "at least one of," when preceding a list of elements, modify the entire list of elements and do not modify the individual elements of the list.

Hereinafter, a composite cathode active material for an all-solid-state battery according to embodiments, a preparation method thereof, and an all-solid-state battery including the composite cathode active material will be described in more detail.

As a solid electrolyte for an all-solid-state battery, a sulfide solid electrolyte may be used.

When a sulfide solid electrolyte is in contact with an oxide active material, the interfacial resistance could be significantly increased due to interfacial reactions such as formation of a resistance layer by diffusion of metal elements or formation of a lithium-deficient layer by a potential difference, thereby significantly degrading cycle and rate characteristics. As described above, the performance of some sulfide solid electrolytes may be deteriorated by a reaction with a cathode.

Thus, to address the increased interfacial resistance caused by a side reaction between a cathode and the sulfide solid electrolyte, a composite cathode active material having a buffer layer may be used.

An embodiment provides a composite cathode active material for an all-solid-state battery (that includes a sulfide solid electrolyte). The composite cathode active material may include a secondary particle including a plurality of primary particles and a buffer layer on the secondary particle. The secondary particle may include, e.g., a nickel lithium transition metal oxide represented by Formula 1, and the buffer layer may include, e.g., a first buffer layer adjacent to the surface of the secondary particle and including an oxide (e.g., metal oxide) represented by Formula 2 and a second buffer layer including an oxide (e.g., metal oxide) represented by Formula 3.

$$Li_aNi_{1-b}M_bO_2 \quad \text{Formula 1}$$

In Formula 1, a and b may satisfy the following relations: 0.95≤a≤1.10, 0<b<0.5. M may be, e.g., cobalt (Co), manganese (Mn), aluminum (Al), or a combination thereof.

$$Li_xA_yO_z \quad \text{Formula 2}$$

In Formula 2, x, y, and z may satisfy the following relations: 0≤x≤3, 0<y≤2, 0<z≤4.

A may be, e.g., titanium (Ti), silicon (Si), zirconium (Zr), niobium (Nb), boron (B), lanthanum (La), molybdenum (Mo), phosphorus (P), magnesium (Mg), Al, zinc (Zn), or a combination thereof.

$$Li_xE_yO_z \quad \text{Formula 3}$$

In Formula 3, x, y, and z may satisfy the following relations: 0≤x≤3, 0<y≤2, 0<z≤4.

E may be different from A of Formula 2. E may be, e.g., Ti, Si, Zr, Nb, B, La, Mo, P, Mg, Al, Zn, or a combination thereof.

In the composite cathode active material according to an embodiment, an amount of A may be in a range of about 0.1 mol % to about 5 mol %, and an amount of E may be in a range of about 0.1 mol % to about 5 mol %, based on 100 mol % of the composite cathode active material. In an implementation, A may be, e.g., Ti, and E may be, e.g., Zr. The amounts of A and E may be measured through inductively coupled plasma (ICP) analysis.

Referring to FIG. 1, a composite cathode active material 100 may include, e.g., a secondary particle 104 including a plurality of primary particles 101; and a first buffer layer 105 and a second buffer layer 102 that are sequentially on a surface of the secondary particle 104. The secondary particle 104 may include a nickel lithium transition metal oxide represented by Formula 1 having a layered structure.

The first buffer layer 105 may include the oxide of Formula 2 and may help maintain stability at a high voltage. In addition, the second buffer layer 102 may include the oxide of Formula 3 and may contribute to maintaining reaction stability with respect to a sulfide solid electrolyte.

In an implementation, at a grain boundary 103 (e.g., at an interior of the secondary particle 104), the plurality of the primary particles 101, the first buffer layer, and the second buffer layer may be included. In FIG. 1, the first buffer layer 105 and the second buffer layer 102 present at the grain boundary 103 are collectively denoted by reference number 106. A total amount of the oxides present at the grain boundary 103 may be smaller than a total amount of the oxides present on the surface of the secondary particle 104.

A total thickness of the buffer layers may be in a range of, e.g., about 0.001 μm to about 1 μm, about 10 nm to about 60 nm, or about 10 nm to about 50 nm. A thickness of each of the first buffer layer 105 and the second buffer layer 104 that constitute the buffer layer may be, e.g., about 1 μm or less, about 500 nm or less, about 100 nm or less, about 50 nm or less, in a range of about 1 nm to about 40 nm or about 5 nm to about 30 nm. A thickness ratio of the first buffer layer 105 to the second buffer layer 102 may be, e.g., in a range of about 0.1 to about 10. In an implementation, the first buffer layer may cover about 50 vol % or more, about 55 vol % or more, or about 55 vol % to 60 vol % of the surface of the nickel lithium transition metal oxide having a layered crystal structure. When having such a structure, a side reaction between a cathode and the sulfide solid electrolyte may be substantially reduced or effectively minimized or effectively blocked.

In the composite cathode active material according to an embodiment, the first buffer layer 105 and the second buffer layer 102 may be present so that the increase in interfacial resistance due to the side reaction between a cathode and the sulfide solid electrolyte may be addressed, thereby improving stability at a high voltage and reaction stability with respect to the sulfide solid electrolyte. In addition, the oxide of Formula 2 and the oxide of Formula 3 may have excellent electrochemical stability at a high voltage and excellent reaction stability with respect to the sulfide solid electrolyte. The oxide of Formula 2 may have a high electrochemical window and a high redox potential, resulting in increased structural stability at a high voltage state on a cathode surface. In this regard, the reactivity to the sulfide solid electrolyte may become low, thereby suppressing the electrolyte decomposition.

In an implementation, the sulfide solid electrolyte may be, e.g., an argyrodite-type sulfide solid electrolyte.

In an implementation, the oxide of Formula 2 may be, e.g., represented by Formula 2-1, and the oxide of Formula 3 may be, e.g., represented by Formula 3-1:

$$Li_xTi_yO_z \quad \text{Formula 2-1}$$

In Formula 2-1, x, y, and z may satisfy the following relations: 0≤x≤3, 0<y≤2, and 0<z≤4.

$$Li_xZr_yO_z \quad \text{Formula 3-1}$$

In Formula 3-1, x, y, and z may satisfy the following relations: 0≤x≤3, 0<y≤2, and 0<z≤4.

In Formulae 2-1 and 3-1, x, y, and z may satisfy the following relations: 1.5≤x≤2.5, 1y≤2, and 6<z≤8.

In an implementation, the oxide of Formula 2 may include, e.g., $Li_2TiO_3$, $Li_2ZrO_3$, $ZrO_2$, $La_2O_3$, $Nb_2O_3$, $B_2O_3$, $TiO_2$, $SiO_2$, $MgO$, $Al_2O_3$, $ZnO$, $Li_3PO_4$, or a combination thereof. In an implementation, the oxide of Formula 3 may include, e.g., $Li_2ZrO_3$, $Li_2TiO_3$, $ZrO_2$, $La_2O_3$, $Nb_2O_3$, $B_2O_3$, $TiO_2$, $SiO_2$, $MgO$, $Al_2O_3$, $ZnO$, $Li_3PO_4$ or a combination thereof.

In an implementation, the nickel lithium transition metal oxide of Formula 1 may have a layered crystal structure, and the oxide of Formula 2 and the oxide of Formula 3 may each independently have a triclinic crystal structure or a monoclinic crystal structure.

Among the oxides of Formula 2, $Li_2TiO_3$ may have a triclinic crystal structure and a P-1 space group. In an implementation, among the oxides of Formula 3, $Li_2ZrO_3$ may have a monoclinic crystal structure and a C2/c space group.

A total amount of the oxide of Formula 2 present in the first buffer layer 105 and the oxide of Formula 3 present in the second buffer layer 102 may be 0.2 mol % to about 0.5 mol %, based on 100 mol % of the nickel lithium transition metal oxide of Formula 1, the oxide of Formula 2, and the oxide of Formula 3. The term "100 mol % of the nickel lithium transition metal oxide of Formula 1, the oxide of Formula 2, and the oxide of Formula 3" as used herein refers to 100 mol % of the composite cathode active material.

An amount of each of the oxide of Formula 2 present in the first buffer layer 105 and the oxide of Formula 3 present in the second buffer layer 102 may be in a range of about 0.01 mol % to about 0.5 mol %, about 0.05 mol % to about 0.4 mol %, or about 0.1 mol % to about 0.3 mol %, based on 100 mol % of the nickel lithium transition metal oxide of Formula 1, the first buffer layer 105, and the second buffer layer 102.

When the amounts of the oxide of Formula 2 and the oxide of Formula 3 are within the ranges above, the reaction stability and high-voltage stability with respect to the sulfide solid electrolyte may be improved.

In the composite cathode active material according to an embodiment, the first buffer layer may include a Li—Ti—O phase ($Li_2O\ TiO_2$), and the second buffer layer may include a Li—Zr—O phase ($Li_2O\ ZrO_2$).

When inductively coupled plasma spectrometry (ICP) is performed on the composite cathode active material according to an embodiment, an amount of Ti may be in a range of about 0.1 mol % to about 5 mol %, and an amount of Zr may be in a range of about 0.1 mol % to about 5 mol %.

In an implementation, the nickel lithium transition metal oxide of Formula 1 may be, e.g., represented by Formula 1-1, a compound represented by Formula 1-2, or a combination thereof.

$$Li_aNi_{1-b1-b2}Co_{b1}Mn_{b2}O_2 \qquad \text{Formula 1-1}$$

In Formula 1-1, a, b1, and b2 may satisfy the following relations: $0.95 \leq a \leq 1.10$, $0 < b1+b2 < 0.5$, $0 < b1 < 0.2$, and $0 < b2 < 0.2$.

$$Li_aNi_{1-b1-b2}Co_{b1}Al_{b2}O_2 \qquad \text{Formula 1-2}$$

In Formula 1-2, a, b1, and b2 may satisfy the following relations: $0.95 \leq a \leq 1.10$, $0 < b1+b2 < 0.5$, $0 < b1 < 0.2$, and $0 < b2 < 0.05$.

In an implementation, the nickel lithium transition metal oxide may include, e.g., $LiNi_{0.9}Co_{0.07}Mn_{0.03}O_2$, $LiNi_{0.9}Co_{0.07}Al_{0.03}O_2$, $Li_{1.03}[Ni_{0.91}Co_{0.06}Mn_{0.03}]O_2$, $Li_{1.03}[Ni_{0.88}Co_{0.08}Mn_{0.04}]O_2$, $Li_{1.03}[Ni_{0.8}Co_{0.15}Mn_{0.05}]O_2$, $Li_{1.03}[Ni_{0.85}Co_{0.10}Mn_{0.05}]O_2$, $Li_{1.03}[Ni_{0.91}Co_{0.05}Mn_{0.04}]O_2$, $Li_{1.05}[Ni_{0.91}Co_{0.06}Mn_{0.03}]O_2$, $Li_{1.06}[Ni_{0.91}Co_{0.06}Mn_{0.03}]O_2$, $Li_{1.06}[Ni_{0.88}Co_{0.08}Mn_{0.04}]O_2$, $Li_{1.06}[Ni_{0.8}Co_{0.115}Mn_{0.05}]O_2$, $Li_{1.06}[Ni_{0.85}Co_{0.10}Mn_{0.05}]O_2$, $Li_{1.06}[Ni_{0.91}Co_{0.05}Mn_{0.04}]O_2$, $Li_{1.09}[Ni_{0.91}Co_{0.06}Mn_{0.03}]O_2$, $Li_{1.09}[Ni_{0.88}Co_{0.08}Mn_{0.04}]O_2$, $Li_{1.09}[Ni_{0.8}Co_{0.15}Mn_{0.05}]O_2$, $Li_{1.09}[Ni_{0.85}Co_{0.10}Mn_{0.05}]O_2$, $Li_{1.09}[Ni_{0.91}Co_{0.05}Mn_{0.04}]O_2$, $LiNi_{0.91}Co_{0.06}Al_{0.03}O_2$, $LiNi_{0.88}Co_{0.08}Al_{0.04}O_2$, $LiNi_{0.8}Co_{0.15}Al_{0.05}O_2$, $LiNi_{0.85}Co_{0.10}Al_{0.05}O_2$, $LiNi_{0.91}Co_{0.05}Al_{0.04}O_2$, or the like.

In an implementation, the sulfide solid electrolyte may include, e.g., $Li_2S—P_2S_5$, $Li_2S—P_2S_5$—LiX (where X is a halogen atom), $Li_2S—P_2S_5—Li_2O$, $Li_2S—P_2S_5—Li_2O—LiI$, $Li_2S—SiS_2$, $Li_2S—SiS_2$—LiI, $Li_2S—SiS_2$—LiBr, $Li_2S—SiS_2$—LiCl, $Li_2S—SiS_2—B_2S_3$—LiI, $Li_2S—SiS_2—P_2S_5$—LiI, $Li_2S—B_2S_3$, $Li_2S—P_2S_5—Z_mS_n$ (where m and n are positive numbers, and Z is Ge, Zn, or Ga), $Li_2S—GeS_2$, $Li_2S—SiS_2—Li_3PO_4$, $Li_2S—SiS_2$-$Li_pMO_q$ (where p and q are positive numbers, and M is P, Si, Ge, B, Al, Ga, or In), $Li_{7-x}PS_{6-x}Cl_x$, (where $0 \leq x \leq 2$), $Li_{7-x}PS_{6-x}Br_x$, (where $0 \leq x \leq 2$), and $Li_{7-x}PS_{6-x}I_x$ (where $0 \leq x \leq 2$). The sulfide solid electrolyte may be, e.g., an argyrodite-type solid electrolyte including $Li_6PS_5Cl$, $Li_6PS_5Br$, or $Li_6PS_5I$.

Hereinafter, a method of preparing the composite cathode active material according to an embodiment will be described as follows.

The nickel lithium transition metal oxide of Formula 1, a precursor of the oxide of Formula 2, a lithium precursor, an organic solvent, and water may be mixed together to obtain a first mixture. Then, to the first mixture, a precursor of the oxide of Formula 3 and an organic solvent may be added to obtain a second mixture and perform a reaction thereon:

$$Li_xA_yO_z \qquad \text{Formula 2}$$

In Formula 2, x, y, and z may satisfy the following relations. $0 \leq x \leq 3$, $0 < y \leq 2$, $0 < z \leq 4$.

A may be, e.g., Ti, Si, Zr, Nb, B, La, Mo, P, Mg, Al, Zn, or a combination thereof.

$$Li_xE_yO_z \qquad \text{Formula 3}$$

In Formula 3, x, y, and z may satisfy the following relations. $0 \leq x \leq 3$, $0 < y \leq 2$, $0 < z \leq 4$.

E may be different from A or Formula 2, and may be, e.g., Ti, Si, Zr, Nb, B, La, Mo, P, Mg, Al, Zn, or a combination thereof.

The reaction product may be dried, and then heat-treated.

The precursor of the oxide of Formula 2 may include a lithium precursor and an A-containing precursor, and the precursor of the oxide of Formula 3 may include a E-containing precursor.

The lithium precursor may include, e.g., lithium hydroxide, lithium carbonate, lithium methoxide, lithium oxide, lithium chloride, lithium sulfate, or the like. In an implementation, the A-containing precursor and the E-containing precursor may respectively include, e.g., A-containing or E-containing alkoxide, A-containing or E-containing carbonate, A-containing or E-containing chloride, A-containing or E-containing phosphate, A-containing or E-containing hydroxide, A-containing or E-containing nitrate, A-containing or E-containing hydroxide, or a combination thereof. In an implementation, the A-containing precursor and the E-containing precursor may include, e.g., titanium butoxide, titanium isopropoxide, TEOS (tetraethyl orthosilicate), zirconium isopoxide, zirconium butoxide, zirconium ethoxide, zirconium chloride, lanthanum chloride, $TiO_2$, $ZrO_2$, or the like. In an implementation, a phosphorus precursor may include, e.g., $(NH_4)_2HPO_4$, $(NH_4)H_2PO_4$, $LiPO_3$, $LiH_2PO_4$, $Li_3PO_4$, trimethyl phosphate, or the like.

The organic solvent may include, e.g., acetone, ethanol, water, ethylene glycol, isopropanol, or a combination thereof. An amount of the organic solvent may be, e.g., in a range of about 50 parts by weight to about 1,000 parts by weight, for example, about 100 parts by weight to about 300 parts by weight, based on 100 parts by weight of a total weight of the precursors.

The reaction may be a sol-gel reaction. After the reaction, the solvent may be removed through a drying process. The drying may be performed at a temperature in a range of about 100° C. to about 150° C. In an implementation, the drying may be performed for, e.g., about 1 hour to about 3 hours.

The first buffer layer 105 may be formed by a hydrolysis precipitation reaction, and the second buffer layer 102 may be formed by a sol-gel reaction after the drying process.

The heat treatment may be performed at a temperature in a range of about 300° C. to about 700° C., e.g., about 250° C. to about 500° C. As such, the first buffer layer 105 and the second buffer layer 102 may be simultaneously formed in a one-step reaction. According to the method disclosed herein, the first buffer layer 105 and the second buffer layer 102 may each be formed as a conformal coating layer. The description of the conformal coating layer (also referred to as conformal coating or uniform coating) as used herein may refer to a coating layer having excellent conformal coating uniformity and surface coverage.

The heat-treating may be performed under an oxidizing atmosphere.

The term "conformality" as used herein may be defined as so-called step coverage, and may refer to i) a ratio (%) of a film formation rate on an x-axis and a film formation rate on a y-axis, or ii) a ratio of an average thickness of layers formed in a horizontal direction to an average thickness of layers formed in a vertical direction. The conformal coating layer may have conformality in a range of about 80% to about 100%, about 82% to about 100%, about 83% to about 99%, about 85% to about 99%, or about 90% to about 95%. Here, the conformality may be observed through a scanning electron microscope (SEM).

The conformal coating layer may be a dense layer, and may be formed on the surface of the secondary particle 104 and the grain boundary 103 among the plurality of primary particles 101 to help improve the surface morphology of the composite cathode active material. In this regard, the interface resistance between a cathode and the sulfide solid electrolyte may be effectively controlled to be reduced.

If the heat treatment were to be performed at a temperature less than 300° C. or a temperature exceeding 700° C., a portion of the buffer layer containing the oxides may not be formed, thereby deteriorating the high-voltage stability and reaction stability with respect to the electrolyte. When the composite cathode active material layer is heat-treated at a temperature within the ranges described above, a cathode having improved high-voltage stability and reaction stability with respect to the sulfide solid electrolyte may be provided.

In addition, the time for the heat treatment may vary depending on the temperature of the heat treatment. The heat treatment may be performed, e.g., for about 1 hour to about 20 hours, about 1 hour to about 10 hours, or about 2 hours to about 8 hours. The heat-treating may be performed under an oxidizing atmosphere.

An oxidizing atmosphere may be carried out under oxygen or in the ambient atmosphere (e.g., air).

The method of preparing the composite cathode active material of the present disclosure may be performed by the sol-gel reaction as described above, and thus unlike other preparation methods, the buffer layers may each be formed as a conformal coating layer.

Another aspect of the present disclosure provides a cathode including the composite cathode active material according to an embodiment.

Another aspect of the present disclosure provides an all-solid-state battery including, e.g., a cathode layer; an anode layer; and a solid electrolyte layer between the cathode layer and the anode layer. The cathode layer may include the composite cathode active material layer according to an embodiment. In an implementation, the all-solid-state battery may be, e.g., an all-solid-state secondary battery.

[All-Solid-State Battery]

Figure 4:
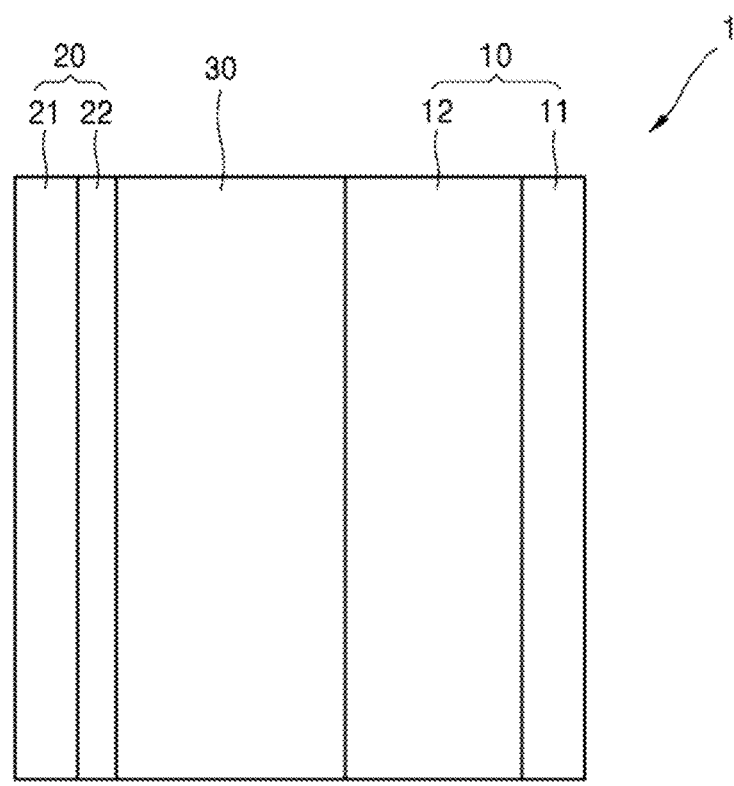
FIG. 4 is schematic diagram of a structure of an all-solid-state battery according to an embodiment.

Referring to FIG. 4, an all-solid-state battery 1 may include, e.g., a cathode layer 10; an anode layer 20; and a solid electrolyte layer 30 between the cathode layer 10 and the anode layer 20.

The cathode layer 10 may include a cathode current collector 11 and a cathode active material layer 12 on the cathode current collector 11. The cathode active material layer 12 may include the composite cathode active material according to an embodiment, a binder, and a solid electrolyte. The solid electrolyte may be a sulfide solid electrolyte, an oxide solid electrolyte, or a combination thereof. In an implementation, the solid electrolyte may be an argyrodite-type sulfide solid electrolyte. In addition, the anode layer 20 may include an anode current collector 21 and an anode active material layer 22 on the anode current collector 21.

[Cathode Layer: Cathode Current Collector]

The cathode current collector 11 may be, e.g., in the form of a plate or a foil, including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In an implementation, the cathode current collector 11 may be omitted.

The cathode current collector 11 may further include a carbon layer located on one or both surfaces of a metal substrate. When the carbon layer is additionally located on the metal substrate, a metal of the metal substrate may be prevented from being corroded by a solid electrolyte included in the cathode layer 10, and the interfacial resistance between the cathode active material layer 12 and the cathode current collector 11 may be reduced. A thickness of the carbon layer may be, e.g., in a range of about 1 m to about 5 μm. When the carbon layer is too thin, the contact between the metal substrate and the solid electrolyte may not be completely blocked. When the carbon layer is too thick, the energy density of the all-solid-state battery may be reduced. The carbon layer may include amorphous carbon, crystalline carbon, or the like.

[Cathode Layer: Cathode Active Material]

The cathode active material layer 12 may include, e.g., the composite cathode active material according to an embodiment, a solid electrolyte, a binder, and a solvent.

The cathode active material layer 12 may include a conductive material. The conductive material may include, e.g., graphite, carbon black (CB), acetylene black (AB), carbon nanofiber, or carbon nanotube.

The solid electrolyte included in the cathode layer 10 may be similar to or different from a solid electrolyte included in the solid electrolyte layer 30. Details on the solid electrolyte may be understood by referring to the solid electrolyte layer 30.

For the cathode active material, a suitable cathode active material other than the composite cathode active material according to an embodiment may be further included. The cathode active material may include, e.g., a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, or the like, nickel sulfide, copper sulfide, lithium sulfide, iron oxide, vanadium oxide, or the like. A suitable material available as the cathode active material may be used. The cathode active material may be used alone or in a mixture of two or more materials.

The lithium transition metal oxide may include, e.g., a compound represented by one of the following formulae: $Li_aA_{1-b}B_bD_2$ (where $0.90 \leq a \leq 1$ and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$. In the compound represented by the formulae above, A may be Ni, Co, Mn, or a combination thereof, B may be Al, Ni, Co, Mn, Cr, Fe, Mg, Sr, V, a rare earth element, or a combination thereof, D may be O, F, S, P, or a combination thereof, E may be Co, Mn, or a combination thereof, F may be F, S, P, or a combination thereof, G may be Al, Cr, Mn, Fe, Mg, La, Ce, Sr, V, or a combination thereof, Q may be Ti, Mo, Mn, or a combination thereof, I may be Cr, V, Fe, Sc, Y, or a combination thereof, and J may be V, Cr, Mn, Co, Ni, Cu, or a combination thereof. A compound having a coating layer added to the surface of the compound described above may be also used, and a mixture of the compound described above and a compound having a coating layer added thereto may be also used. Such a coating layer added to the surface of the compound may include, e.g., a coating element compound such as an oxide of a coating element, hydroxide, oxyhydroxide of a coating element oxycarbonate of a coating element, or hydroxy carbonate of a coating element. Such a coating element compound including the coating layer may be amorphous or crystalline. The coating element included in the coating layer may include Mg, Al, Co, K, Na, Ca, Si, Ti, V, Sn, Ge, Ga, B, As, Zr, or a mixture thereof. A method of forming a coating layer may be selected within a range that does not adversely affect the physical properties of the cathode active material. A coating method may include, e.g., spray coating, dipping, or the like.

The cathode active material may include, e.g., a lithium salt of a transition metal oxide having a layered rock salt type structure, among the lithium transition metal oxides described above. The term "layered rock salt type structure" as used herein may refer to, for example, a structure in which oxygen atomic layers and metal layers are alternatively arranged regularly in the <111> direction of a cubic rock salt type structure to form a two-dimensional plane by each of the atomic layers. The term "cubic rock salt type structure" as used herein refers to a NaCl type structure which is one type of crystal structures, and in detail, may refer to a structure in which a face centered cubic lattice (fcc) formed by respective anions and cations is misaligned from each other by ½ of the ridge of a unit lattice. The lithium transition metal oxide having such a layered rock salt type structure may be a ternary compound, such as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the cathode active material includes a ternary lithium transition metal oxide having the layered rock salt type, the all-solid-state secondary battery 1 may have further improved energy density and thermal stability.

The cathode active material may be covered by the coating layer as described above. For use as the coating layer, a suitable coating layer for a cathode active material of an all-solid-state secondary battery may be used. The coating layer may be, e.g., $Li_2O$—$ZrO_2$ (LZO) or the like.

When the cathode active material includes, e.g., Ni as the ternary lithium transition metal oxide such as NCA or NCM, the volume density of the all-solid-state battery 1 may increase to reduce the metal elution of the cathode active material in a charged state. Consequently, the cycle characteristics of the all-solid-state battery 1 may be improved.

The cathode active material may be in the form of, e.g., a globular or oval sphere. A particle diameter of the cathode active material may be within a range applicable to the cathode active material of the all-solid-state battery 1. An amount of the cathode active material in the cathode layer 10 may be within a range applicable to the cathode of an all-solid-state battery.

[Cathode Layer: Solid Electrolyte]

The cathode active material layer 12 may include, e.g., a solid electrolyte.

The cathode active material layer 12 may include, e.g., a sulfide solid electrolyte. The solid electrolyte included in the cathode layer 10 may be similar to or different from a solid electrolyte included in the solid electrolyte layer 30. Details on the solid electrolyte may be understood by referring to the solid electrolyte layer 30.

The solid electrolyte included in the cathode active material layer 12 may have a smaller value of an average particle diameter (D50) than the solid electrolyte included in the solid electrolyte layer 30. For example, the average particle diameter D50 of the solid electrolyte included in the cathode active material layer 12 may be about 90% or less, 80% or less, 70% or less, 60% or less, 50% or less, 40% or less, 30% or less, or 20% or less, of the particle diameter D50 of the solid electrolyte included in the solid electrolyte layer 30.

[Cathode Layer: Binder]

The cathode active material layer 12 may include a binder. The binder may include, e.g., polyvinylidene fluoride, styrene butadiene rubber (SBR), polytetrafluoroethylene, polyvinylidene fluoride, vinylidene fluoride/hexafluoropropylene copolymer, polyacrylonitrile, or polymethyl methacrylate.

[Cathode Layer: Conductive Material]

The cathode active material layer 12 may include a conductive material. The conductive material may include, e.g., graphite, CB, AB, ketjen black (KB), carbon fiber, metal powder, or the like.

[Cathode Layer: Other Additives]

The cathode layer 10 may further include, e.g., additives such as a filler, a coating agent, a dispersant, or an ion conductive auxiliary agent, in addition to the cathode active material, the solid electrolyte, the binder, and the cathode active material described above.

For use as a filler, a coating agent, a dispersant, an ion conductive auxiliary agent, or the like that may be included in the cathode layer 10, a suitable material generally used for an electrode of an all-solid-state battery may be used.

[Solid Electrolyte Layer]

The solid electrolyte included in the solid electrolyte layer may be a sulfide solid electrolyte.

[Solid Electrolyte Layer: Sulfide Solid Electrolyte]

Figure 5:
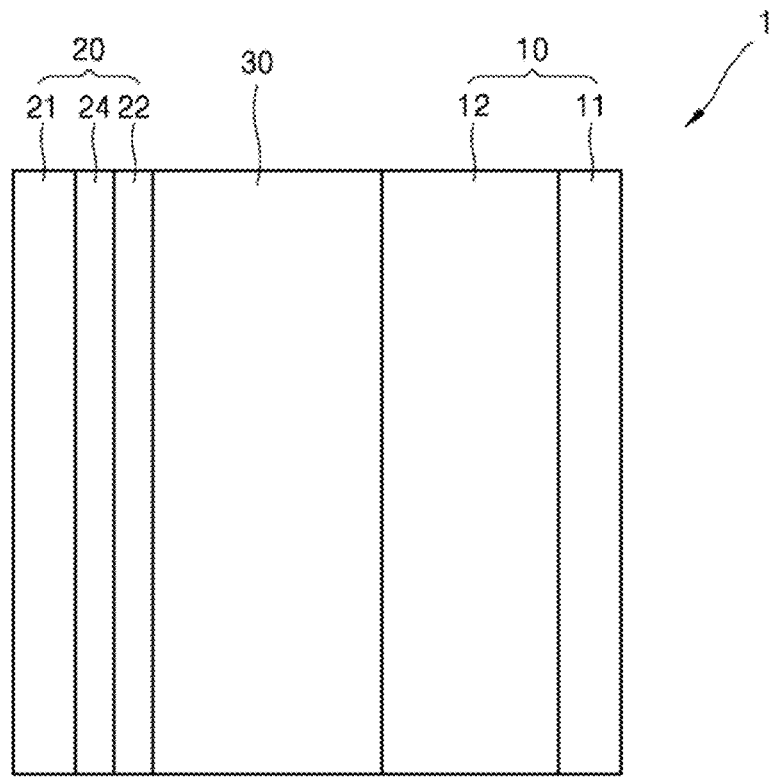
FIG. 5 is schematic diagram of a structure of an all-solid-state battery according to another embodiment.
Figure 6:
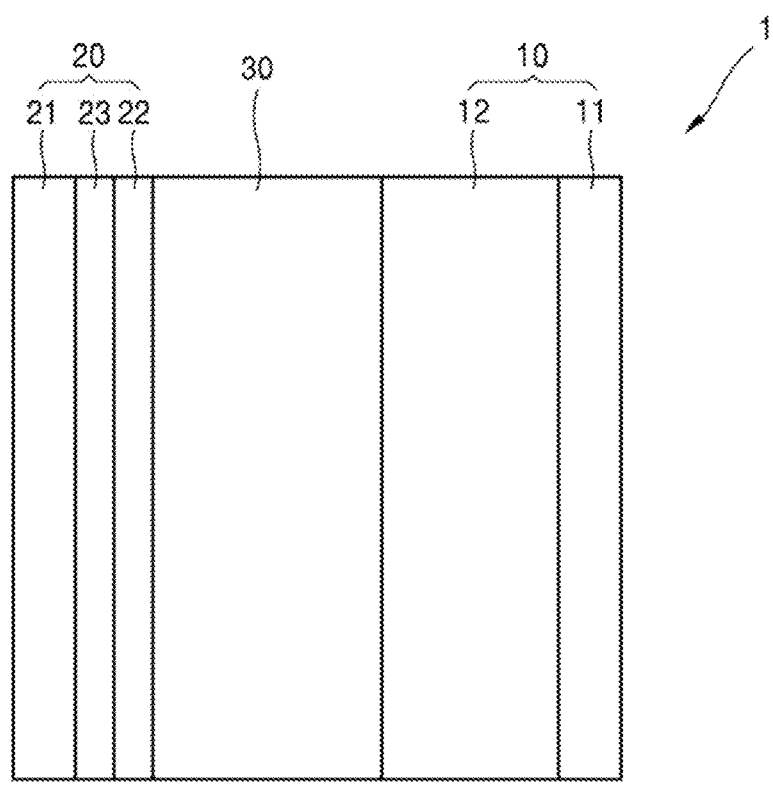
FIG. 6 is schematic diagram of a structure of an all-solid-state battery according to another embodiment.

Referring to FIGS. 5 and 6, the solid electrolyte layer 30 may include a sulfide solid electrolyte between the cathode layer 10 and the anode layer 20.

In the all-solid-state battery according to an embodiment, the solid electrolyte layer in a case where the cathode layer includes the sulfide solid electrolyte according to an embodiment may include a suitable sulfide solid electrolyte.

The general sulfide solid electrolyte may include, e.g., $Li_2S$—$P_2S_5$, $Li_2S$—$P_2S_5$—LiX (where X is a halogen atom), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is one of Ge, Zn, and Ga), $Li_2S$—$GeS_2$, $Li_2S$—$SiS_2$—$Li_3PO_4$, $Li_2S$—$SiS_2$-$Li_pMO_q$ (where p and q are positive numbers, and M is one of P, Si, Ge, B, Al, Ga, and In), $Li_{7-x}PS_{6-x}Cl_x$, (where $0 \leq x \leq 2$), $Li_{7-x}PS_{6-x}Br_x$, (where $0 \leq x \leq 2$), or $Li_{7-x}PS_{6-x}I_x$ (where $0 \leq x \leq 2$). The sulfide solid electrolyte may be, e.g., prepared by treating a starting material, such as $Li_2S$, $P_2S_5$, and the like by a melting quenching method or a mechanical milling method. Also, after such treatment, heat treatment may be performed. The solid electrolyte may be amorphous or crystalline, or may be in a mixed state. In addition, the solid electrolyte may include, e.g., sulfur (S), phosphorus (P), and lithium (Li), as at least constituent elements of the above-described sulfide solid electrolyte material. In an implementation, the solid electrolyte may be a material including $Li_2S$—$P_2S_5$. When $Li_2S$—$P_2S_5$ is included as a sulfide solid electrolyte material for forming the solid electrolyte, a mixing molar ratio of $Li_2S$ to $P_2S_5$ ($Li_2S:P_2S_5$) may be, e.g., in a range of 50:50 to about 90:10.

The sulfide solid electrolyte may be, e.g., an argyrodite-type compound including $Li_{7-x}PS_{6-x}Cl_x$ (where $0 \leq x \leq 2$), $Li_{7-x}PS_{6-x}Br_x$ (where $0 \leq x \leq 2$), or $Li_{7-x}PS_{6-x}I_x$ (where $0 \leq x \leq 2$). In an implementation, the sulfide solid electrolyte may include, e.g., an argyrodite-type solid electrolyte including $Li_6PS_5Cl$, $Li_6PS_5Br$, or $Li_6PS_5I$.

A density of the sulfide solid electrolyte may be in a range of about 1.5 g/cc to about 2.0 g/cc. When the density of the sulfide solid electrolyte is within the range above, the internal resistance of the all-solid-state battery may be reduced, and penetration of the solid electrolyte by Li may be effectively suppressed.

[Solid Electrolyte Layer: Binder]

The solid electrolyte layer 30 may include, e.g., a binder. The binder included in the solid electrolyte layer 30 may include, e.g., SBR, polytetrafluoroethylene, polyvinylidene fluoride, polyethylene, or the like. The binder included in the solid electrolyte layer 30 may be the same as or different from the binders included in the cathode active material layer 12 and the first anode active material layer 22. The first anode active material layer is denoted by the same reference number 22 as the anode active material layer for convenience.

[Anode Layer]
[Anode Layer: Anode Active Material]

The anode layer 20 may include an anode current collector 21 and a first anode active material layer 22 on the anode current collector 21. The first anode active material layer 22 may include, e.g., an anode active material and a binder.

The anode active material included in the first anode active material layer 22 may have, e.g., a particle shape. An average particle diameter of the anode active material having a particle shape may be, e.g., about 4 µm or less, about 2 µm or less, about 1 µm or less, or about 900 nm or less. The average particle diameter of the anode active material having a particle shape may be, e.g., in a range of about 10 nm to about 4 m, about 10 nm to about 2 µm, or about 10 nm to about 900 nm. When the anode active material has the average particle diameter within the ranges above, lithium may be further easily subjected to reversible absorbing and/or desorbing during charge and discharge. The average particle diameter of the anode active material may be, e.g., a median diameter (D50) measured using a laser particle size distribution meter.

The anode active material may include, e.g., a carbon anode active material or a metal or metalloid anode active material.

The carbon anode active material may be, e.g., amorphous carbon. The amorphous carbon may include, e.g., CB, AB, furnace black (FB), ketjen black (KB), graphene, or the like. The amorphous carbon may be carbon that does not have crystallinity or has very low crystallinity, and in this regard, may be distinguished from crystalline carbon or graphite.

The metal or metalloid anode active material may include, e.g., gold (Au), platinum (Pt), palladium (Pd), silicon (Si), silver (Ag), aluminum (Al), bismuth (Bi), tin (Sn), or zinc (Zn). In an implementation, since nickel (Ni) does not form an alloy with lithium, it is not a metal anode active material.

The first anode active material layer 22 may include a kind of anode active material from among the anode active materials described above, or a mixture of a plurality of different anode active materials. In an implementation, the first anode active material layer 22 may include only amorphous carbon, or one or more selected from gold (Au), platinum (Pt), palladium (Pd), silicon (Si), silver (Ag), aluminum (Al), bismuth (Bi), tin (Sn), and zinc (Zn). In an implementation, the first anode active material layer 22 may include a mixture of amorphous carbon with or one or more selected from Au, Pt, Pd, Si, Ag, Al, Bi, Sn, and Zn. A mixing ratio of the amorphous carbon to Au or the like in the mixture may be, e.g., in a range of about 10:1 to about 1:2, about 5:1 to about 1:1, or about 4:1 to about 2:1. The mixing ratio may be determined depending on the desired characteristics of the all-solid-state battery 1. When the anode active material has such a composition, the cycle characteristics of the all-solid-state battery 1 may be further improved.

The anode active material included in the first anode active material layer 22 may include, e.g., a mixture of first particles including amorphous carbon and second particles including metal or metalloid. The metal or metalloid may include, e.g., Au, Pt, Pd, Si, Ag, Al, Bi, Sn, Zn, or the like. The metalloid may be, e.g., a semiconductor. An amount of the second particles may be in a range of about 8 wt % to about 60 wt %, about 10 wt % to about 50 wt %, about 15 wt % to about 40 wt %, or about 20 wt % to about 30 wt %, based on the total weight of the mixture. When the amount of the second particles is within the ranges above, the cycle characteristics of the all-solid-state battery 1 may be further improved.

[Anode Layer: Binder]

The binder included in the first anode active material layer 22 may include, e.g., SBR, polytetrafluoroethylene, polyvinylidene fluoride, polyethylene, vinylidene fluoride/hexafluoropropylene copolymer, polyacrylonitrile, polymethyl methacrylate, or the like. The binder may be used alone, or may be used with a plurality of different binders.

When the first anode active material layer 22 includes the binder, the first anode active material layer 22 may be stabilized on the anode current collector 21. In addition, despite a change in volume and/or relative position of the first anode active material layer 22, cracking of the first anode active material layer 22 may be suppressed. If the first anode active material layer 22 does not include a binder, the first anode active material layer 22 may be easily separated from the anode current collector 21. At a portion where the anode current collector 21 is exposed by the separation of the first anode active material layer 22 from the anode current collector 2, the possibility of occurrence of a short circuit increases as the anode current collector 21 may be in contact with the solid electrolyte layer 30. The first anode active material layer 22 may be prepared by, e.g., coating the anode current collector 21 with a slurry in which a material constituting the first anode active material layer 22 is dispersed, and drying the coating. The inclusion of the binder in the first anode active material layer 22 may facilitate stable dispersion of the anode active material in the slurry. In an implementation, when the slurry is applied on the anode current collector 21 by a screen-printing method, clogging of the screen (e.g., clogging by an agglomerate of the anode electrode active material) may be suppressed.

[Anode Layer: Other Additives]

The anode active material layer may further include additives, e.g., a filler, a coating agent, a dispersant, an ion conductive auxiliary agent, or the like.

[Structure of Anode Layer]

A thickness of the anode active material layer 22 may be, e.g., about 50% or less, about 40% or less, about 30% or less, about 20% or less, about 10% or less, or about 5% or less, of a thickness of the cathode active material layer 12. The thickness of the anode active material layer 22 may be, e.g., in a range of about 1 μm to about 20 μm, about 2 μm to about 10 μm, or about 3 μm to about 7 μm. When the anode active material layer 22 is too thin, lithium dendrites formed between the anode active material layer 22 and the anode current collector 21 may collapse the anode active material layer 22, so that the cycle characteristics of the all-solid-state battery 1 may be difficult to improve. When the thickness of the anode active material layer 22 is excessively increased, the energy density of the all-solid-state battery 1 may be lowered and the internal resistance of the all-solid-state battery 1 by the anode active material layer 22 may be increased, so that the cycle characteristics of the all-solid-state battery 1 may be difficult to improve.

When the thickness of the anode active material layer 22 is decreased, e.g., the charging capacity of the anode active material layer 22 may be also decreased. The charging capacity of the anode active material layer 22 may be, e.g., about 50% or less, about 40% or less, about 30% or less, about 20% or less, about 10% or less, or about 5% or less, of a charging capacity of the cathode active material layer 12. The charging capacity of the anode active material layer 22 may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 2%, with respect to the charging capacity of the cathode active material layer 12. When the charging capacity of the anode active material layer 22 is significantly small, the first anode active material layer 22 becomes very thin. In this regard, lithium dendrites formed between the anode active material layer 22 and the anode current collector 21 during a repeated charging and discharging process may collapse the first anode active material layer 22, and thus the cycle characteristics of the all-solid-state battery 1 may be difficult to improve. When the charging capacity of the first anode active material layer 22 is excessively increased, the energy density of the all-solid-state battery 1 may be lowered and the internal resistance of the all-solid-state battery 1 by the first anode active material layer 22 may be increased, so that the cycle characteristics of the all-solid-state battery 1 may be difficult to improve.

The charging capacity of the cathode active material layer 12 may be obtained by multiplying the charging capacity density (mAh/g) of the cathode active material by the mass of the cathode active material in the cathode active material layer 12. When several types of the cathode active material are used, the charging capacity density is multiplied by the mass for each cathode active material, and the sum of these values is the charging capacity of the cathode active material layer 12. The charging capacity of the anode active material layer 22 is calculated in the same way. That is, the charging capacity of the anode material layer 22 may be obtained by multiplying the charging capacity density (mAh/g) of the anode active material 22 by the mass of the anode active material 22 in anode active material layer 22. When several types of the anode active material are used, the charging capacity density is multiplied by the mass for each anode active material, and the sum of these values is the charging capacity of the anode active material layer 22. Here, the charge capacity densities of the cathode active material and the anode active material are capacities estimated using an all-solid-state half-cell using lithium metal as a counter electrode. The charging capacities of the cathode active material layer 12 and the anode active material layer 22 may be directly measured by measuring the charging capacity using the all-solid-state half-cell. When the measured charge capacity is divided by the mass of each active material, the packed capacity density is obtained. In an implementation, the charging capacities of the cathode active material layer 12 and the anode active material layer 22 may be initial charging capacity measured during the first cycle.

A carbon layer may be further included between the anode active material layer 22 and the solid electrolyte layer 30.

[Anode Layer: Anode Current Collector]

The anode current collector 21 may be formed of, e.g., a material that does not react with lithium, or a material that forms neither an alloy nor a compound with lithium. Such a material for forming the anode current collector 21 may include, e.g., Cu, stainless steel, Ti, iron (Fe), cobalt (Co), nickel (Ni), and the like. A thickness of the anode current collector 21 may be in a range of about 1 μm to about 20 μm, about 5 μm to about 15 μm, or about 7 μm to about 10 μm.

The anode current collector 21 may be formed of one of the above-described metals, a coating material, or an alloy or two or more metals. The anode current collector 21 may be, e.g., in the form of a plate or foil.

Referring to FIG. 5, the all-solid-state battery 1 may further include, e.g., a thin-film 24 including an element capable of forming an alloy with lithium on the negative electrode current collector 21. The thin-film 24 may be arranged between the anode current collector 21 and the anode active material layer 22. The thin-film 24 may include, e.g., an element capable of forming an alloy with lithium. The element capable of forming an alloy with lithium may include, e.g., gold, silver, zinc, tin, indium, silicon, aluminum, bismuth, or the like. The thin-film 24 may be formed of one of these metals or an alloy of several types of metals. By arranging the thin-film 24 on the anode current collector 21, e.g., a precipitated shape of a second anode active material layer precipitated between the thin-film 24 and the anode active material layer 22 may be further flattened, thereby further improving the cyclic characteristics of the all-solid-state battery 1. The anode active material layer 22 may be the first anode active material layer.

A thickness of the thin-film 24 may be, e.g., in a range of about 1 nm to about 800 nm, about 10 nm to about 700 nm, about 50 nm to about 600 nm, or about 100 nm to about 500 nm. When the thickness of the thin-film 24 is less than 1 nm, a function by the thin-film 24 may not be exhibited. When the thin-film 24 is too thick, the thin-film 24 itself could occlude lithium so that an amount of lithium precipitated in the anode layer 20 may decrease, thereby lowering the energy density of the all-solid-state battery 1 and accordingly deteriorating the cycle characteristics of the all-solid-state battery 1. The thin-film 24 may be arranged on the anode current collector 21 by, e.g., a vacuum deposition method, a sputtering method, a plating method, or the like.

[Anode Layer: Anode Active Material]

The anode layer 20 may include the anode current collector 21 and the first anode active material layer 22 on the anode current collector 21. The first anode active material layer 22 may include, e.g., an anode active material and a binder.

The anode active material included in the first anode active material layer 22 may have, e.g., a particle shape. An average particle diameter of the anode active material having a particle shape may be, e.g., about 4 μm or less, about 2 μm or less, about 1 μm or less, or about 900 nm or less. The average particle diameter of the anode active material having a particle shape may be, e.g., in a range of about 10 nm to about 4 m, about 10 nm to about 2 μm, or about 10 nm to about 900 nm. When the anode active material has the average particle diameter within the ranges above, lithium may be further easily subjected to reversible absorbing and/or desorbing during charge and discharge. The average particle diameter of the anode active material may be, for example, a median diameter (D50) measured using a laser particle size distribution meter.

The anode active material may include, e.g., a carbon anode active material or a metal or metalloid anode active material.

The carbon anode active material may be, e.g., amorphous carbon. The amorphous carbon may include, for example CB, AB, furnace black FB, KB, graphene, and the like. The amorphous carbon may be carbon that does not have crystallinity or has very low crystallinity, and in this regard, may be distinguished from crystalline carbon or graphite.

The metal or metalloid anode active material may include, e.g., Au, Pt, Pd, Si, Ag, Al, Bi, Sn, or Zn. For example, since nickel (Ni) does not form an alloy with lithium, it is not a metal anode active material.

The first anode active material layer 22 may include a kind of anode active material from among the anode active materials described above, or a mixture of a plurality of different anode active materials. In an implementation, the first anode active material layer 22 may include only amorphous carbon, or one or more selected from Au, Pt, Pd, Si, Ag, Al, Bi, Sn, and Zn. In an implementation, the first anode active material layer 22 may include a mixture of amorphous carbon with or one or more selected from Au, Pt, Pd, Si, Ag, Al, Bi, Sn, and Zn. A mixing ratio of the amorphous carbon to Au or the like in the mixture may be, e.g., in a range of about 10:1 to about 1:2, about 5:1 to about 1:1, or about 4:1 to about 2:1. The mixing ratio may be determined depending on the characteristics of the required all-solid-state battery 1. When the anode active material has such a composition, the cycle characteristics of the all-solid-state battery 1 may be further improved.

The anode active material included in the first anode active material layer 22 may include, e.g., a mixture of first particles including amorphous carbon and second particles including metal or metalloid. The metal or metalloid may include, e.g., Au, Pt, Pd, Si, Ag, Al, Bi, Sn, Zn, or the like. The metalloid may be, e.g., a semiconductor. An amount of the second particles may be in a range of about 8 wt % to about 60 wt %, about 10 wt % to about 50 wt %, about 15 wt % to about 40 wt %, or about 20 wt % to about 30 wt %, based on the total weight of the mixture. When the amount of the second particles is within the ranges above, the cycle characteristics of the all-solid-state battery 1 may be further improved.

[Anode Layer: Precipitation Layer]

Referring to FIG. 6, the all-solid-state battery 1 may further include, e.g., a second anode active material layer 23 between the anode current collector 21 and the first anode active material layer 22 by charging.

The second anode active material layer 23 may be a metal layer including Li or a Li alloy. The metal layer may include Li or a Li alloy. In an implementation, the second anode active material layer 23 which is a Li-including metal layer may serve as, e.g., a Li reservoir. The Li alloy may be, e.g., a Li—Al alloy, a Li—Sn alloy, a Li—In alloy, a Li—Ag alloy, a Li—Au alloy, a Li—Zn alloy, a Li—Ge alloy, a Li—Si alloy, or the like. The second anode active material layer 23 may include Li, one of the alloys above, or several kinds of alloys.

A thickness of the second anode active material layer 23 may be, e.g., in a range of about 1 μm to about 1,000 μm, about 1 μm to about 500 μm, about 1 μm to about 200 μm, about 1 μm to about 150 μm, about 1 μm to about 100 μm, or about 1 μm to about 50 μm. When the second anode active material layer 23 is too thin, the second anode active material layer 23 may have a difficulty in performing a function as a Li reservoir. When the second anode active material layer 23 is too thick, the all-solid-state battery 1 may have increased mass and volume, so that the cycle characteristics of the all-solid-state battery 1 may be deteriorated. The second anode active material layer 23 may be, e.g., a metal foil having a thickness within the ranges above.

In the all-solid-state battery 1, the second anode active material layer 23 may be, e.g., arranged between the anode current collector 21 and the first anode active material layer 22 before assembly of the all-solid-state battery 1, or may be precipitated between the anode current collector 21 and the first anode active material layer 22 by charging after assembly of the all-solid-state battery 1.

When the second anode active material layer 23 is arranged between the anode current collector 21 and the first anode active material layer 22 before assembly of the all-solid-state battery 1, the second anode active material layer 23 may be a Li-including metal layer, and thus may serve as a Li reservoir. In addition, in this regard, the all-solid-state battery 1 may including the second anode active material layer 23 may have further improved cycle characteristics. In an implementation, before assembly of the all-solid-state battery 1, a Li foil may be arranged between the anode current collector 21 and the first anode active material layer 22.

When the second anode active material layer 23 is arranged by charging after assembly of the all-solid-state battery 1, the second anode active material layer 23 may not be included at the time of the assembly of the all-solid-state battery 1, and thus the energy density of the all-solid-state battery 1 may increase. In an implementation, when the all-solid-state battery 1 is charged, the charging is performed at a capacity beyond the charging capacity of the first anode active material layer 22. In an implementation, the first anode active material layer 22 may be overcharged. At the beginning of charging, Li may be occluded into the first anode active material layer 22. In an implementation, the anode active material included in the first anode active material layer 22 may form an alloy or compound with Li ions that have migrated from the cathode layer 10. When the charging is performed at a capacity beyond the capacity of the first anode active material layer 22, e.g., Li may be precipitated on a rear surface of the first anode active material layer 22, i.e., a surface between the anode current collector 21 and the first anode active material layer 22. By precipitating Li, a metal layer corresponding to the second anode active material layer 23 may be formed. The second anode active material layer 23 is a metal layer mainly consisting of Li (i.e., metallic Li). Such a result may be obtained, e.g., when the anode active material included in the first anode active material layer 22 includes a material that forms an alloy or compound with Li. At the time of discharging, Li included in the first anode active material layer 22 and the second anode active material layer 23 which is a metal layer may be ionized and move toward the cathode layer 10. Therefore, Li may be used as the anode active material in the all-solid-state battery 1. In addition, the first anode active material layer 22 may cover the second anode active material layer 23, and the first anode active material layer 22 may serve as a protective layer for the second anode active material layer 23 which is a metal layer, and at the same time, may serve as a layer suppressing the precipitation growth of Li dendrite. Therefore, the short circuit and the capacity degradation of the all-solid-state battery 1 may be suppressed, and consequently, the cycling characteristics of the all-solid-state battery 1 may be improved. In addition, when the second active material layer 23 is arranged by charging after the assembly of the all-solid-state secondary battery 1, the anode current collector 21, the first anode active material layer 22, and a region therebetween may be, e.g., Li-free regions that do not include Li in an initial state or a post-discharge state of the all-solid-state secondary battery 1.

Next, a method of preparing an all-solid-state battery employing a cathode using the composite cathode active material will be described below.

First, a composition for forming a cathode active material layer may be prepared by mixing a composite cathode active material, a binder, a solid electrolyte, a conductive material, and a solvent.

Then, a cathode layer may be provided by coating a cathode current collector with the composition for forming the cathode active material layer, and drying the cathode current collector to form a cathode active material layer.

In an implementation, the drying may be performed at a temperature in a range of about 40° C. to about 60° C.

Separately, the method of preparing the all-solid-state battery may include: providing an anode layer including an anode current collector and a first anode active material layer; preparing a laminate by providing a solid electrolyte layer between the anode layer and the cathode layer; and pressing the laminate.

The solid electrolyte may be a solid electrolyte layer including a sulfide solid electrolyte according to an embodiment.

The pressing may be performed at a temperature in a range of about 25° C. to about 90° C., and at a pressure of about 550 MPa or less, e.g., about 500 MPa or less, or in a range of about 400 MPa to 500 MPa, thereby completing the all-solid-state battery. Here, the pressing time may vary depending on the temperature and pressure, and for example, may be less than 30 minutes. In an implementation, the pressing may be, e.g., isostatic press, roll press, or plate press.

The all-solid-state battery according to an embodiment may be applicable to a medium or large-sized battery or an energy storage system (ESS).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of Composite Cathode Active Material)

Preparation Example 1

First, a cathode active material (an active material particle having a composition of $LiNi_{0.90}Co_{0.07}Mn_{0.03}O_2$ and an average particle diameter of 5 μm) was put in ethanol, and titanium (IV) propoxide was added thereto. The mixed solution was then mixed with water and lithium hydroxide (LiOH) to obtain a first mixture. Here, the amounts of ethanol and water were about 100 parts by weight and 0.5 parts by weight, respectively, based on 100 parts by weight of the cathode active material.

Zirconium tetrapropoxide was added to the first mixture to obtain a second mixture.

The amounts of titanium (IV) propoxide and LiOH in the first mixture and zirconium tetrapropoxide in the second mixture were adjusted such that, based on 100 mol % of a finally obtained composite cathode active material, the amount of oxide, i.e., $Li_2TiO_3$ (LiTiO), in the first buffer layer was about 0.125 mol %%, and the amount of oxide, i.e., $Li_2ZrO_3$ (LZO), in the second buffer layer was about 0.125 mol %.

Then, the resultant was mixed for 15 minutes while stirring.

The second mixture was stirred at 125° C. for 2 hours to perform a sol-gel reaction. After the sol-gel reaction was completed, the reaction product was dried at 150° C. for 2 hours to remove the solvent.

Afterwards, the resultant was heat-treated at about 300° C. for 4 hours under an oxygen atmosphere to obtain a composite cathode active material in which a first buffer layer including LTO and a second buffer layer including LZO were sequentially stacked on a surface of the NCM. In the composite cathode active material, the amount of oxide, i.e., $Li_2TiO_3$(LiTiO) in the first buffer layer was about 0.125 mol %, and the amount of oxide, i.e., $Li_2ZrO_3$(LZO) in the second buffer layer was about 0.125 mol %, based on 100 mol % of the composite cathode active material. A total thickness of the buffer layers was about 30 nm, wherein the thickness of the first buffer layer was about 15 nm, and the thickness of the second buffer layer was about 15 nm.

Preparation Example 2

A composite cathode active material was prepared in the same manner as in Preparation Example 1, except that the amounts of titanium (IV) propoxide and LiOH in the first mixture and the amount of zirconium tetrapropoxide in the second mixture were changed so that, in a finally obtained composite cathode active material, the amount of LTO was about 0.05 mol %, and the amount of LZO was about 0.20 mol %, based on 100 mol % of the composite cathode active material.

Preparation Example 3

A composite cathode active material was prepared in the same manner as in Preparation Example 1, except that the amounts of titanium (IV) propoxide and LiOH in the first mixture and the amount of zirconium tetrapropoxide in the second mixture were changed so that, the amount of LTO was about 0.1 mol %, and the amount of LZO was about 0.4 mol %, based on 100 mol % of the composite cathode active material.

Comparative Preparation Example 1

As a cathode active material, $LiNi_{0.90}Co_{0.07}Mn_{0.03}O_2$ was used.

Comparative Preparation Example 2

Titanium (IV) propoxide, a cathode active material (an active material particle having a composition of $LiNi_{0.90}Co_{0.07}Mn_{0.03}O_2$ and an average particle diameter of 5 μm), LiOH, and ethanol were mixed together to obtain a first mixture.

In the first mixture, the amounts of titanium (IV) propoxide and LiOH were adjusted so that, in a finally obtained composite cathode active material, the amount of oxide, i.e., $Li_2TiO_3$ (LiTiO), in the first buffer layer was about 0.25 mol % with respect to $LiNi_{0.90}Co_{0.07}Mn_{0.03}O_2$.

Then, the resultant was mixed for 15 minutes while stirring.

The resultant was stirred at a temperature in a range of about 100° C. to about 150° C. for 2 hours to perform a sol-gel reaction. After the sol-gel reaction was completed, the reaction product was dried at 150° C. to remove the solvent.

Afterwards, the resultant was heat-treated at about 300° C. for 4 hours under an oxygen atmosphere to obtain a composite cathode active material in which a buffer layer including LTO was stacked on a surface of the NCM. In the composite cathode active material, the amount of LTO was 0.25 mol %, and the thickness of the buffer layer was 30 nm.

Comparative Preparation Example 3

Zirconium tetrapropoxide, a cathode active material (an active material particle having a composition of $LiNi_{0.90}Co_{0.07}Mn_{0.03}O_2$ and an average particle diameter of 5 μm), LiOH, and ethanol were mixed together to obtain a first mixture.

Zirconium tetrapropoxide and ethanol were added to the first mixture to obtain a second mixture.

In the first mixture, the amounts of zirconium tetrapropoxide and LiOH were adjusted so that, in a finally obtained composite cathode active material, the amount of oxide, i.e., $Li_2ZrO_3$ (LZO), in the first buffer layer was about 0.25 mol % with respect to $LiNi_{0.90}Co_{0.07}Mn_{0.03}O_2$(NCM).

Then, the resultant was mixed for 15 minutes while stirring.

The resultant was stirred at a temperature in a range of about 100° C. to about 150° C. for 2 hours to perform a sol-gel reaction. After the sol-gel reaction was completed, the reaction product was dried at 150° C. to remove the solvent.

Afterwards, the resultant was heat-treated at about 300° C. for 4 hours under an oxygen atmosphere to obtain a composite cathode active material in which a buffer layer including LZO was stacked on a surface of the NCM. In the composite cathode active material, the amount of oxide, i.e., $Li_2ZrO_3$ (LZO), was 0.25 mol % with respect to $LiNi_{0.90}Co_{0.07}Mn_{0.03}O_2$(NCM). The thickness of the buffer layer was about 30 nm.

(Preparation of all-Solid-State Battery)

Manufacture Example 1

(Preparation of Cathode Layer)

As a cathode active material, the composite cathode active material was prepared. As a solid electrolyte, a crystalline argyrodite-type solid electrolyte ($Li_6PS_5Cl$) was used. In addition, polytetrafluoroethylene (PTFE) (Teflon binder manufactured by DuPont Company) was prepared as a binder, and a carbon nanofiber (CNF) was prepared as a conductive agent. The cathode active material, the solid electrolyte, the CNF, and the binder were mixed first at a weight ratio of 86.91:11.85:0.25:0.99, and the mixture was added to octyl acetate which is a dispersant, so as to prepare a composition for forming a cathode active material layer. The total weight of the solid cathode active material layer represents the total weight of the cathode active material, the solid electrolyte, the CNF, and the binder.

After the composition for forming the cathode active material layer was formed into a sheet, a first heat treatment process was performed thereon in a convection oven at 40° C. for 2 hours, and then dried. Subsequently, a second heat treatment process was performed thereon in a vacuum oven at 80° C. for 12 hours, and then dried to prepare a cathode layer.

(Preparation of Anode Layer)

As an anode current collector, a Ni foil having a thickness of 10 μm was prepared. In addition, as anode active materials, CB having a particle diameter of about 30 nm and Ag particles having an average particle diameter of about 60 nm were prepared.

0.25 g of mixed powder in which CB and Ag particles at a weight ratio of 3:1 was added to a container, and 2 g of an NMP solution containing 7 wt % of a PVDF binder (#9300, Kureha Corporation) was added thereto to prepare a mixed solution. Then, a slurry was prepared by stirring the mixed solution while adding NMP little by little to the mixed solution. The prepared slurry was applied onto the Ni foil using a bar coater, and dried in a convection oven at 80° C. for 10 minutes to obtain a laminate. The laminate thus obtained was vacuum-dried at 100° C. for 8 hours to 10 hours. According to the process described above, an anode layer in which a first anode active material layer was formed on an anode current collector was prepared.

(Preparation of Solid Electrolyte Layer)

4 wt % of a binder solution was prepared by adding an acrylic binder (SX-A334, Zeon Co., Ltd.) to octyl acetate. A slurry was prepared by adding the prepared acrylic binder solution to an argyrodite-type solid electrolyte ($Li_6PS_5Cl$) (D50=3 μm, crystalline) and mixing with a Thinky mixer. The slurry included 1.5 parts by weight of the acrylic binder with respect to 98.5 parts by weight of the solid electrolyte. The slurry was applied onto a non-woven fabric using a bar coater, and then dried in a convection oven at 50° C. for 5 minutes to obtain a laminate. The laminate thus obtained was dried in a vacuum oven at 40° C. for at least 10 hours. As such, a solid electrolyte layer was prepared by the process described above.

(Preparation of all-Solid-State Battery)

The solid electrolyte layer was arranged between the cathode layer and the anode layer to prepare a laminate. The laminate thus prepared was subjected to a hot-plate pressing process at 80° C. under a pressure of 500 MPa for 10 minutes to prepare an all-solid-state battery. The solid electrolyte layer was sintered by the pressing process, thereby improving battery characteristics. The thickness of the pressurized cathode active material layer was about 80 μm, the thickness of the anode active material layer was 7 μm, and the thickness of the solid electrolyte layer was 60 μm.

Manufacture Examples 2 and 3

An all-solid-state battery was manufactured in the same manner as in Manufacture Example 1, except that, in preparing a cathode layer, the composite cathode active material of Preparation Example 2 and Preparation Example 3 was used, respectively, instead of the composite cathode active material of Preparation Example 1.

Comparative Manufacture Example 1

An all-solid-state battery was prepared in the same manner as in Manufacture Example 1, except that, in forming a cathode layer, a cathode active material (LiNi$_{0.90}$Co$_{0.07}$Mn$_{0.03}$O$_2$) of Comparative Preparation Example 1 was used instead of the composite cathode active material of Preparation Example 1.

Comparative Manufacture Examples 2 to 5

All-solid-state batteries were manufactured in the same manner as in Manufacture Example 1, except that, in preparing a cathode layer, the composite cathode active materials of Comparative Preparation Examples 2 to 5 were respectively used instead of the composite cathode active material of Preparation Example 1.

Evaluation Example 1: Discharge Capacity

Torque cells were prepared using the composite cathode active materials of Preparation Examples 1 to 3 and Comparative Preparation Examples 1 to 5. A torque cell was prepared according to the following method.

For use as a cathode of a torque cell, a composite cathode active material, a solid electrolyte, and CNF were mixed at a weight ratio of 60:35:5 to prepare a composition.

The composition was uniformly distributed on a solid electrolyte filled in a torque cell having a diameter of 13 mm.

For use as an anode, a Li metal having a thickness of about 20 μm and an In metal having a thickness of 50 μm were used.

For use as a solid electrolyte, an argyrodite solid electrolyte (Li$_6$PS$_5$Cl) (D50=3 μm, crystalline) filled a torque cell having a diameter of 13 mm.

The solid electrolyte was arranged between the cathode and the anode to prepare a torque cell.

The torque cell was pressed at a pressure of 40 kN for 1 minute to maximize the interfacial contact. Here, the pressing force for the torque cell was set to be 4N m.

The torque cell was subjected to electrochemical evaluation at 45° C. as follows. First, regarding the theoretical capacity, the cell was charged with a constant current of 0.1 C until a voltage reached 4.25 V with respect to a Li anode, and then discharged with a constant current of 0.1 C to a lower limit voltage of 2.5 V, so as to evaluate the discharge capacity. The results of evaluation are shown in Table 1.

Evaluation Example 2: Discharge Current Characteristics

Torque cells were prepared using the composite cathode active materials of Preparation Examples 1 to 3 and Comparative Preparation Examples 1 to 5. The torque cells were prepared in the same manner as in the method of preparing the torque cell of Evaluation Example 1. Using the torque cells, a cycle of charging and discharging was performed once at 45° C., 2.5 V to 4.25 V, 0.1 C-rate and 1 C-rate, respectively, and changes in the discharge capacity in each case were measured therefrom.

The discharge current characteristics are shown in Table 1 by calculation according to Equation 1:

Discharge current characteristic(%)=(discharge capacity at 1 C/discharge capacity at 0.1 C)×100  Equation 1

Evaluation Example 3: Interfacial Resistance

Torque cells were prepared using the composite cathode active materials of Preparation Examples 1 to 3 and Comparative Preparation Examples 1 to 5. The resistance for each torque cell was measured by electrochemical impedance spectroscopy (EIS), and the interfacial resistance was observed through the points where the semicircular line intersects the x-axis in the obtained graph. The interfacial resistance between the cathode and the sulfide solid electrolyte is shown in Table 1 below.

TABLE 1

| | Buffer layer | | Discharge capacity | Discharge current characteristics | Interfacial resistance |
|---|---|---|---|---|---|
| Class | First buffer layer | Second buffer layer | (mAh/g) | (%, 1 C./0.1 C.) | (Ω) |
| Preparation Example 1 | 0.125 mol % Li—Ti—O | 0.125 mol % Li—Zr—O | 189 | 87.2 | 19 |
| Preparation Example 2 | 0.05 mol % Li—Ti—O | 0.20 mol % Li—Zr—O | 182 | 87.2 | 26 |
| Preparation Example 3 | 0.1 mol % Li—Ti—O | 0.4 mol % Li—Zr—O | 180 | 87.1 | 26 |
| Comparative Preparation Example 1 | — | — | 198 | 79.7 | 332 |
| Comparative Preparation Example 2 | 0.25 mol % Li—Ti—O | — | 191 | 85.7 | 40 |
| Comparative Preparation Example 3 | 0.25 mol % Li—Zr—O | — | 201 | 85.3 | 59 |

As shown in Table 1, the torque cells having the cathodes obtained by using the composite cathode active materials of Preparation Examples 1 to 3 had small interfacial resistance, high discharge capacity, and excellent discharge current characteristics, whereas the torque cells having the cathodes obtained by using the composite cathode active materials of Comparative Preparation Examples 1 to 3 had large interfacial resistance against lithium, discharge capacity that was not sufficiently expressed, and poor discharge current characteristic compared to the torque cells including the cathodes obtained by using the composite cathode active materials of Preparation Examples 1 to 3.

Evaluation Example 4: SEM-EDS Analysis and TEM-EDS Analysis

The SEM-EDS analysis and TEM-EDS analysis were performed on the composite cathode active material of Preparation Example 1. For the SEM-EDS analysis, Magellan 400 L from FEI company was used, and for TEM-the EDS analysis on the cross section of the composite cathode active material, Helios G4 HX from Thermo Fisher was used.

Figure 2A:
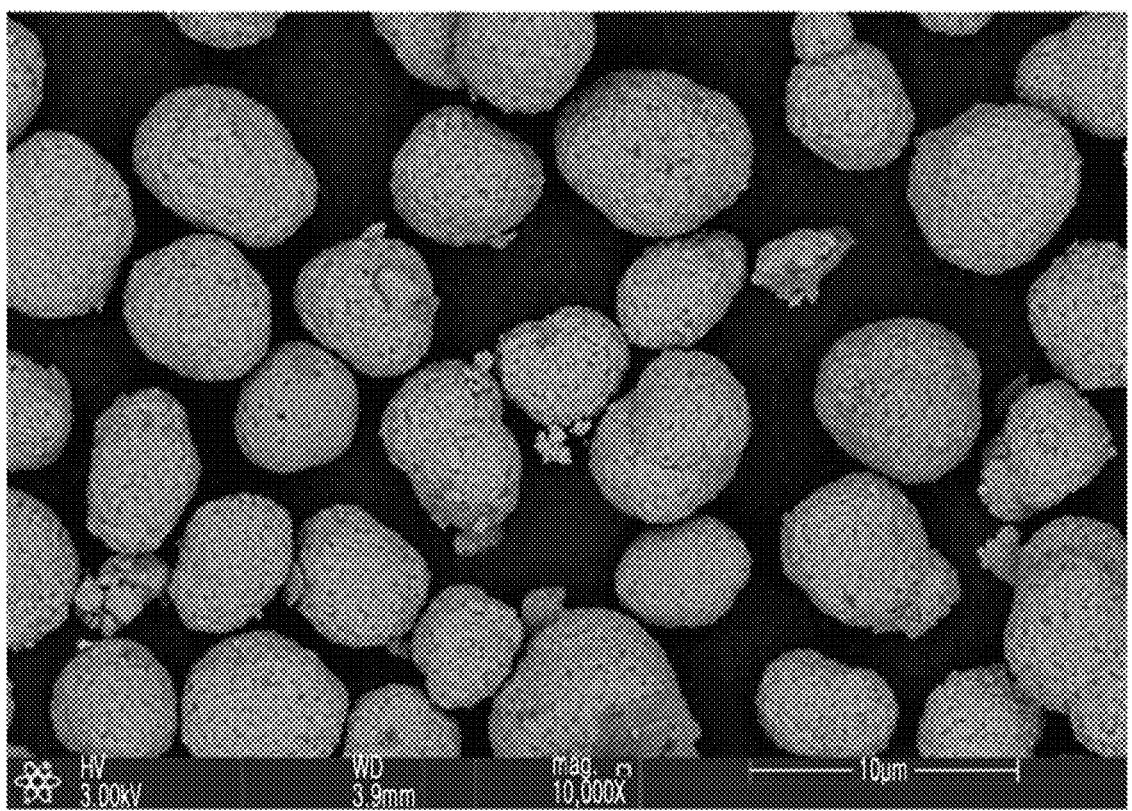
FIGS. 2A to 2C show scanning electron scope (SEM)-energy dispersive X-ray spectroscope (EDS) analysis results for a surface of a composite cathode active material prepared according to Preparation Example 1.
Figure 2B:
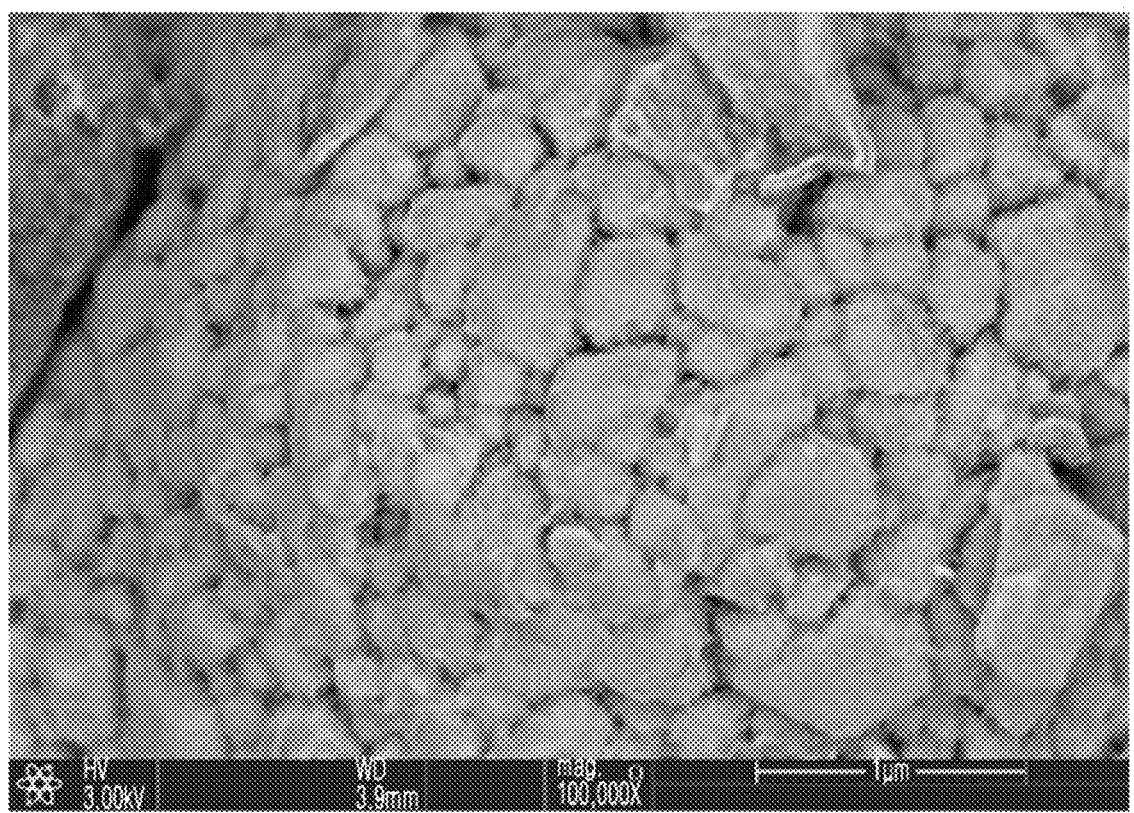
Figure 2C:
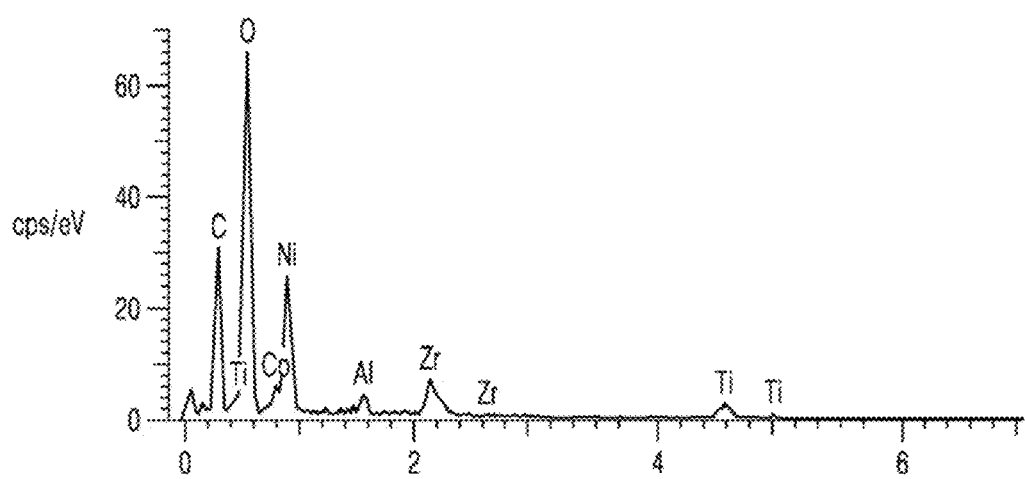
Figure 3A:
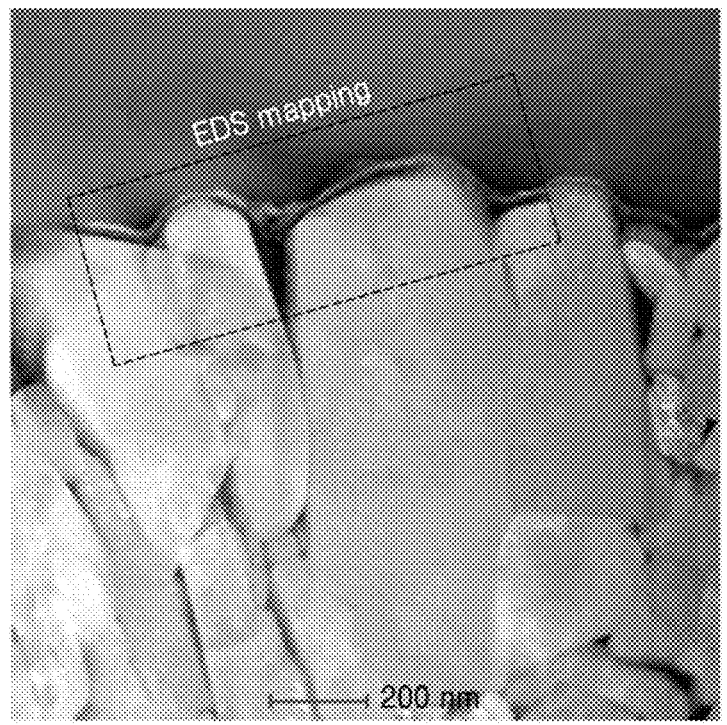
FIGS. 3A to 3D show transmission electron scope (TEM)-EDS analysis results for a cross-section of a composite cathode active material prepared according to Preparation Example 1.
Figure 3B:
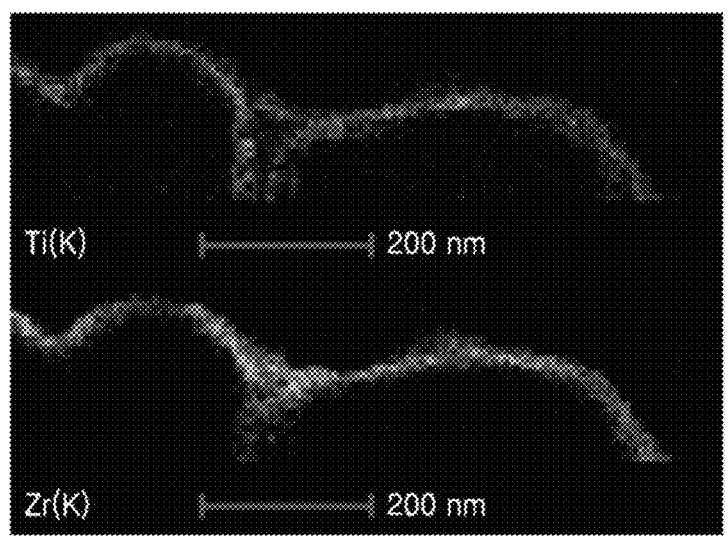
Figure 3C:
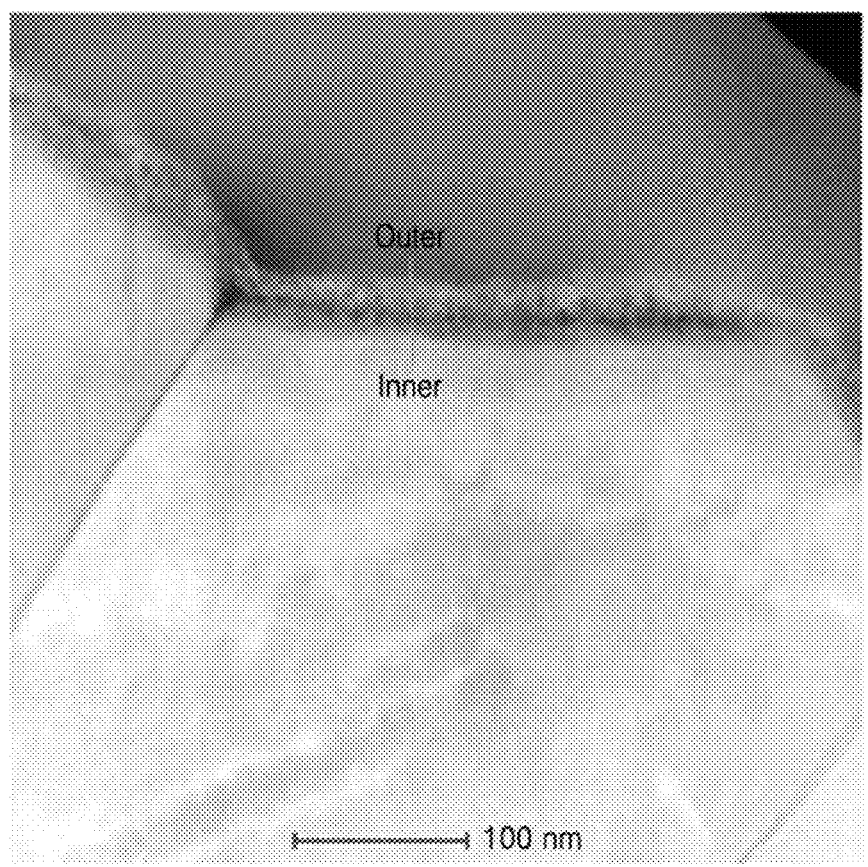
Figure 3D:
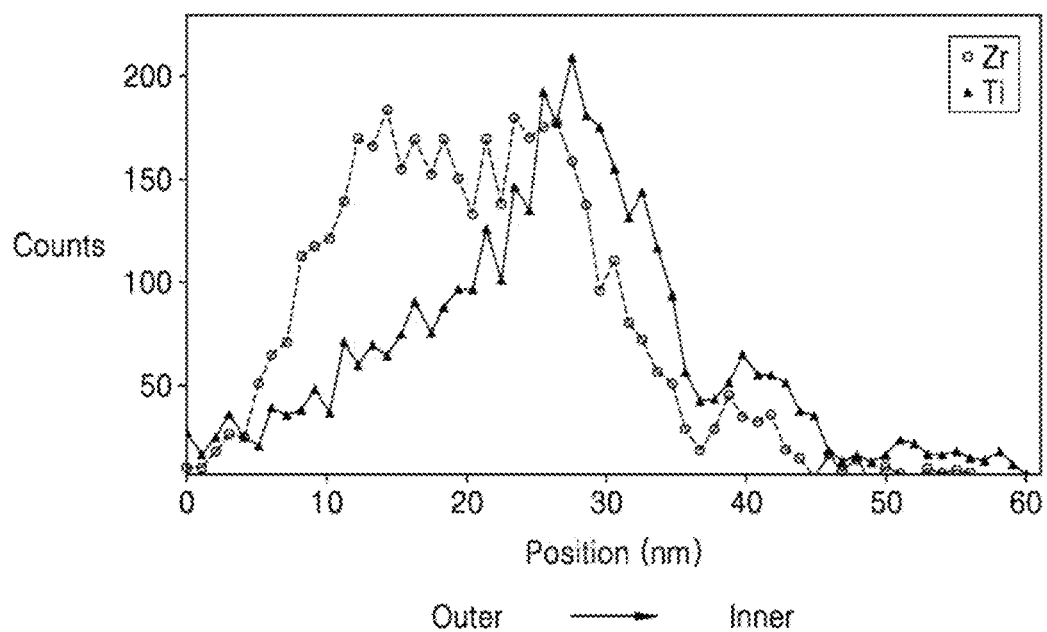

The SEM-EDS analysis results are shown in FIGS. 2A to 2C. In addition, the TEM-EDS analysis results on the cross section of the composite cathode active material are shown in FIGS. 3A to 3D. In FIG. 3C, "Inner" and "Outer" indicate a first buffer layer and a second buffer layer, respectively.

Referring to FIGS. 2A to 2C, it was observed through the SEM-EDS that Ti and Zr were detected. According to the TEM mapping images of FIGS. 3A to 3D, it was observed that the first buffer layer included Ti and the second buffer layer included Zr.

Evaluation Example 5: High-Voltage Stability

The electrochemical stability and reactivity of the oxide to the Li metal were calculated, and the results are shown in Table 2 below.

The stable electrochemical window with respect to the Li metal represents a voltage range in which the solid electrolyte is not oxidized or reduced, and in the case of the buffer layer used for the cathode, the higher the oxidized voltage, the more stable it was. The voltage at which the $Li_2ZrO_3$ buffer layer was oxidized may be obtained from the reaction equation in which the buffer layer was oxidized as shown below:

$$2Li_2ZrO_3 \rightarrow 2ZrO_2 + 4Li + O_2$$

The voltage at which the buffer layer was oxidized based on the reaction equation above may be calculated based on the framework of density functional theory (DFT), and may be obtained by direct calculation utilizing a public database based on the DFT such as the Materials Project (www.materialsproject.org) or using the Vienna ab initio simulation package (VASP). The electrochemical window was calculated in the same manner not only for the $Li_2ZrO_3$ buffer layer, but also for other buffer layers.

Evaluation Example 6: Electrolyte Reactivity

The electrolyte reactivity of the metal oxide of Preparation Example 1 was calculated as follows.

A method of calculating the electrolyte reactivity of the oxide was based on the framework the DFT in the same way as the electrochemical window calculation method.

The calculation results of the stability with the electrolyte are shown in Table 2 below.

In Table 2, the electrochemical window was calculated according to the method based on the DFT, and in terms of the buffer layer decomposition, the higher level of the buffer layer decomposition level, the higher value represents the more stable characteristics. The redox potential was obtained by a method based on the DFT. The value refers to a potential at which one Li atom is completely removed, and the higher value represents the more stable characteristics.

TABLE 2

| Class | Metal oxide | Electrochemical window (V) | Redox potential (V) | Electrolyte Reactivity (eV/atom) |
|---|---|---|---|---|
| Li—Zr—O | $Li_2ZrO_3$ | 3.41 | 4.65 | −0.103 |
| Li—Ti—O | $Li_2TiO_3$ | 3.71 | 4.84 | −0.077 |

In Table 2, the electrochemical window refers to a parameter related to the buffer layer decomposition potential, and the higher value represents more stable characteristics. In addition, as the absolute value of the electrolyte reactivity decreased, the occurrence of a side reaction between cathode active material and the sulfide solid electrolyte also decreased, resulting in the improved electrolyte reaction stability.

Referring to Table 2, it may be seen that the oxide had improved stability due to a high buffer layer decomposition potential with respect to the Li metal, as well as excellent stability due to low reactivity with respect to the electrolyte. The oxide exhibited improvements in the redox potential and the electrolyte stability.

Evaluation Example 7: ICP Analysis

To find out the amount of elements included in the buffer layer of the composite cathode active material of each of Preparation Examples 1 to 3 and Comparative Preparation Examples 2 to 5, a method based on inductively coupled plasma spectroscopy (ICP) was used for analysis as follows. As an ICP analysis device, ICP-AES (ICP 5300DV, Perkinelemer) was used.

0.1 g each of the composite cathode active material was added, and 2 ml of distilled water and 3 ml of concentrated nitric acid were added thereto. Then, the mixed solution was sealed with a lid, and a sample was dissolved therein. When the sample was completely dissolved, 50 ml of ultrapure water was added thereto for dilution. Afterwards, the diluted solution was diluted 10 times again, and then subjected to the ICP analysis. The ICP analysis was operated under the following conditions: Forward Power of 1,300 W; Torch Height of 15 mm; Plasma gas flow of 15.00 L/min; sample gas flow if 0.8 L/min; Auxiliary gas flow of 0.20 L/min and pump speed of 1.5 ml/min. As a result, the amounts of the elements included in the buffer layer of the composite cathode active material are shown in Tables 3 and 4 below.

TABLE 3

| | Buffer layer condition | | ICP-AES, wt % | | | | | | | | |
|---|---|---|---|---|---|---|---|---|---|---|---|
| Class | First buffer layer | Second buffer layer | Li | Ni | Co | Mn | Zr | Ti | Zn | Na | S |
| Preparation Example 1 | 0.125 mol % $Li_2TiO_3$ | 0.125 mol % $Li_2ZrO_3$ | 7.1 | 51.16 | 3.97 | 1.62 | 0.27 | 0.124 | 0.26 | 0.02 | 0.105 |
| Preparation Example 2 | 0.05 mol % $Li_2TiO_3$ | 0.20 mol % $Li_2ZrO_3$ | 7.17 | 51.43 | 4.05 | 1.63 | 0.22 | 0.027 | 0.26 | 0.019 | 0.105 |
| Preparation Example 3 | 0.1 mol % $Li_2TiO_3$ | 0.4 mol % $Li_2ZrO_3$ | 7.14 | 51.01 | 4.06 | 1.62 | 0.44 | 0.047 | 0.25 | 0.02 | 0.105 |

TABLE 4

| Class | Buffer layer condition | | ICP-AES, mole, Ni + Co + Mn = 1 | | | | | | |
|---|---|---|---|---|---|---|---|---|---|
| | First buffer layer | Second buffer layer | Li | Ni | Co | Mn | Zr | Ti | Zn |
| Preparation Example 1 | 0.125 mol % $Li_2TiO_3$ | 0.125 mol % $Li_2ZrO_3$ | 1.06 | 0.900 | 0.070 | 0.030 | 0.003 | 0.0027 | 0.0041 |
| Preparation Example 2 | 0.05 mol % $Li_2TiO_3$ | 0.20 mol % $Li_2ZrO_3$ | 1.06 | 0.899 | 0.071 | 0.030 | 0.002 | 0.0006 | 0.0041 |
| Preparation Example 3 | 0.1 mol % $Li_2TiO_3$ | 0.4 mol % $Li_2ZrO_3$ | 1.06 | 0.898 | 0.071 | 0.030 | 0.005 | 0.0010 | 0.0040 |

Referring to Table 3, it may be seen that, in Preparation Examples 1 to 3, Na and S were derived from impurities remaining in the sulfate raw material and NaOH, respectively, and Zn was an element doped from the beginning on a cathode material. Also, referring to Table 4, it may be seen that, in Preparation Examples 1 to 3, Zn was an element doped from the beginning on a cathode material.

As shown in Tables 3 and 4, Zr and Ti were detected from the second buffer layer and the first buffer layer that was adjacent to the composite cathode active material in the composite cathode active material of Preparation Examples of 1 to 3, respectively. In addition, it was observed that, when carried out according to Preparation Examples 1 to 3, the amount (experimental value) of the oxide present in the composite cathode active material was similar to the theoretical value.

Evaluation Example 8: Charge/Discharge Test

The charge/discharge characteristics of the all-solid-state batteries of Manufacture Examples 1 to 3 and Comparative Manufacture Examples 1 to 5 were evaluated by the following charge/discharge test.

The battery was charged with a constant current of 0.1 C for 10 hours until the battery voltage reached 4.25 V, and then discharged with a constant current of 0.1 C for 10 hours until the battery voltage reached 2.5 V (first cycle). Subsequently, the battery was charged with a constant current of 0.1 C for 10 hours until the battery voltage reached 4.25 V, and then discharged with a constant current of 0.33 C for 3 hours until the battery voltage reached 2.5 V (second cycle). Afterwards, the battery was charged with a constant current of 0.1 C for 10 hours until the battery voltage reached 4.25 V. Subsequently, the battery was discharged with constant current of 1 C for 1 hour until the battery voltage reached 2.5 V (third cycle).

Afterwards, the battery was charged with a constant current of 0.33 C for 3 hours until the battery voltage reached 4.25 V. Subsequently, the battery was discharged with constant current of 0.33 C for 3 hours until the battery voltage reached 2.5 V (fourth cycle).

Such a cycle was repeated a total of 50 times.

Then, the average voltage, lifespan characteristics, and capacity characteristics were investigated after repeating the cycle.

As a result of evaluating the above-described characteristics, it was observed that the all-solid-state batteries of Manufacture Examples 1 to 3 had excellent characteristics in terms of capacity and discharge current characteristics compared to the batteries of Comparative Manufacture Examples 1 to 5.

By way of summation and review, some lithium-ion batteries may use an electrolytic solution containing a flammable organic dispersion medium, and thus overheating and fire could occur in the case of a short circuit. In this regard, all-solid-state batteries using a solid electrolyte instead of an electrolytic solution may be considered.

All-solid-state batteries do not use a flammable organic dispersion medium, and thus the possibility of fire or explosion may be greatly reduced even in the case of a short circuit. Therefore, such all-solid-state batteries may have significantly increased stability compared to lithium-ion batteries using an electrolytic solution.

For use as a solid electrolyte of an all-solid-state battery, a sulfide solid electrolyte having excellent lithium-ion conductivity may be used. Such a sulfide solid electrolyte could have deteriorated performance due to a reaction with a cathode.

As described above, according to the one or more embodiments, a composite cathode active material for an all-solid-state battery may have improved stability for a reaction with a sulfide solid electrolyte as well as excellent high-voltage stability. When such a composite cathode active material is used, an all-solid-state battery with reduced interfacial resistance between a cathode and a sulfide solid electrolyte, excellent discharge current characteristics, and improved capacity and lifespan characteristics may be prepared.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite cathode active material for an all-solid-state battery that includes a sulfide solid electrolyte, the composite cathode active material comprising:
a secondary particle including a plurality of primary particles; and
a buffer layer on a surface of the secondary particle,
wherein:
the secondary particle includes a nickel lithium transition metal oxide represented by Formula 1,
the buffer layer includes:
a first buffer layer adjacent to a surface of the secondary particle and including an oxide represented by Formula 2-1; and a second buffer layer including an oxide represented by Formula 3, an amount of the oxide represented by Formula 2-1 is in a range of about 0.01 mol % to about 0.5 mol %, an amount of the oxide represented by Formula 3 is in a range of about 0.01 mol % to about 0.5 mol %, and a total amount of the oxide represented by Formula 2-1 and the oxide represented by Formula 3 is in a range of about 0.2 mol % to about 0.5 mol %, all mol % being based on 100 mol % of the composite cathode active material, $$Li_aNi_{1-b}M_bO_2 \qquad \text{Formula 1}$$

in Formula 1, a and b satisfy the following relations: $0.95 \leq a \leq 1.10$, $0 < b < 0.5$, and M is cobalt (Co), manganese (Mn), aluminum (Al), or a combination thereof, $$Li_xTi_yO_z \qquad \text{Formula 2-1}$$

in Formula 2-1, x, y, and z satisfy the following relations: $0 \leq x \leq 3$, $0 < y \leq 2$, $0 < z \leq 4$, and $$Li_xE_yO_z \qquad \text{Formula 3}$$

in Formula 3, x, y, and z satisfy the following relations: $0 \leq x \leq 3$, $0 < y \leq 2$, $0 < z \leq 4$, and E is Si, Zr, Nb, B, La, Mo, P, Mg, Al, Zn, or a combination thereof.

2. The composite cathode active material as claimed in claim 1, wherein:

the oxide represented by Formula 3 is represented by Formula 3-1:

$$Li_xZr_yO_z \qquad \text{Formula 3-1}$$

in Formula 3-1, x, y, and z satisfy the following relations: $0 \leq x \leq 3$, $0 < y \leq 2$, and $0 < z \leq 4$.

3. The composite cathode active material as claimed in claim 1, wherein the oxide represented by Formula 2-1 is $Li_2TiO_3$, or a combination thereof.

4. The composite cathode active material as claimed in claim 1, wherein the oxide represented by Formula 3 is $Li_2ZrO_3$, $ZrO_2$, $La_2O_3$, $Nb_2O_5$, $B_2O_3$, $SiO_2$, $MgO$, $Al_2O_3$, $ZnO$, $Li_3PO_4$, or a combination thereof.

5. The composite cathode active material as claimed in claim 1, wherein:

the nickel lithium transition metal oxide represented by Formula 1 has a layered crystal structure, and the oxide represented by Formula 2-1 and the oxide represented by Formula 3 each independently have a triclinic crystal structure or a monoclinic crystal structure.

6. The composite cathode active material as claimed in claim 1, wherein, according to inductively coupled plasma (ICP) analysis for the composite cathode active material, the composite cathode active material includes:

Ti in an amount of about 0.01 mol % to about 0.5 mol %, and

Zr in an amount of about 0.01 mol % to about 0.5 mol %, all mol % being based on 100 mol % of the composite cathode active material.

7. The composite cathode active material as claimed in claim 1, wherein:

the nickel lithium transition metal represented by Formula 1 is represented by Formula 1-1, a compound represented by Formula 1-2, or a combination thereof:

$$Li_aNi_{1-b1-b2}Co_{b1}Mn_{b2}O_2 \qquad \text{Formula 1-1}$$

in Formula 1-1, a, b1, and b2 satisfy the following relations: $0.95 \leq a \leq 1.10$, $0 < b1+b2 < 0.5$, $0 < b1 < 0.2$, and $0 < b2 < 0.2$, and $$Li_aNi_{1-b1-b2}Co_{b1}Al_{b2}O_2 \qquad \text{Formula 1-2}$$

in Formula 1-2, a, b1, and b2 satisfy the following relations: $0.95 \leq a \leq 1.10$, $0 < b1+b2 < 0.5$, $0 < b1 < 0.2$, and $0 < b2 < 0.05$.

8. The composite cathode active material as claimed in claim 1, wherein:

a total thickness of the buffer layer is in a range of about 5 nm to about 50 nm, a thickness of the first buffer layer is in a range of about 1 nm to about 20 nm, a thickness of the second buffer layer is in a range of about 1 nm to about 20 nm, and a thickness ratio of the first buffer layer to the second buffer layer is in a range of about 0.1 to about 10.

9. The composite cathode active material as claimed in claim 1, wherein the first buffer layer and the second buffer layer are conformal coating layers.

10. A cathode layer for an all-solid-state battery, the cathode layer comprising the composite cathode active material as claimed in claim 1.

11. An all-solid-state battery, comprising:

a cathode layer;

an anode layer; and a sulfide solid electrolyte layer therebetween, wherein the cathode layer includes the composite cathode active material as claimed in claim 1.

12. The all-solid-state battery as claimed in claim 11, wherein the sulfide solid electrolyte is $Li_2S$—$P_2S_5$, $Li_2S$—$P_2S_5$—LiX, in which X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$-$Z_mSn$, in which m and n are positive numbers, and Z is germanium (Ge), Zn, or gallium (Ga), $Li_2S$—$GeS_2$, $Li_2S$—$SiS_2$—$Li_3PO_4$, $Li_2S$—$SiS_2$-$Li_pM O_q$, in which p and q are positive numbers, and M is P, Si, Ge, B, Al, Ga, or indium (In), $Li_{7-x}PS_{6-x}Cl_x$, in which $0 \leq x \leq 2$, $Li_{7-x}PS_{6-x}Br_x$, in which $0 \leq x \leq 2$, and $Li_{7-x}PS_{6-x}I_x$, in which $0 \leq x \leq 2$.

13. The all-solid-state battery as claimed in claim 11, wherein the sulfide solid electrolyte is an argyrodite-type solid electrolyte including $Li_6PS_5Cl$, $Li_6PS_5Br$, or $Li_6PS_5I$.

14. The all-solid-state battery as claimed in claim 11, wherein:

the anode layer includes an anode current collector and a first anode active material layer, a second anode active material layer is on the first anode active material layer, between the anode current collector and the first anode active material layer, or a combination thereof, and the second anode active material layer includes lithium or a lithium alloy.

15. The all-solid-state battery as claimed in claim 11, wherein:

the anode layer includes an anode current collector and a first anode active material layer, and the all-solid-state battery further includes a carbon layer between the first anode active material layer and the solid electrolyte layer.

16. A method of preparing a composite cathode active material for an all-solid-state battery as claimed in claim 1, the method comprising:

mixing a nickel lithium transition metal oxide represented by Formula 1, a precursor of an oxide represented by Formula 2-1, a lithium precursor, an organic solvent, and water to obtain a first mixture;

adding, to the first mixture, a precursor of an oxide represented by Formula 3 and an organic solvent to obtain a second mixture and perform a reaction thereon; and drying and heat-treating the reaction product to obtain the composite cathode active material:

$$Li_aNi_{1-b}M_bO_2 \quad \text{Formula 1}$$

wherein, in Formula 1, a and b satisfy the following relations: $0.95 \leq a \leq 1.10$, $0 < b < 0.5$, and M is cobalt (Co), manganese (Mn), aluminum (Al), or a combination thereof, $$Li_xTi_yO_z \quad \text{Formula 2-1}$$

wherein, in Formula 2-1, x, y, and z satisfy the following relations: $0 \leq x \leq 3$, $0 < y \leq 2$, $0 < z \leq 4$, and $$Li_xE_yO_z \quad \text{Formula 3}$$

wherein, in Formula 3, x, y, and z satisfy the following relations: $0 \leq x \leq 3$, $0 < y \leq 2$, $0 < z \leq 4$, and E is Si, Zr, Nb, B, La, Mo, P, or a combination thereof.

17. The method as claimed in claim 16, wherein the heat-treating is performed at a temperature in a range of about 250° C. to about 500° C.

18. The method as claimed in claim 16, wherein the heat-treating is performed for about 1 hour to about 20 hours under an oxidizing atmosphere.

* * * * *